United States Patent
Amano et al.

(10) Patent No.: US 9,367,498 B2
(45) Date of Patent: Jun. 14, 2016

(54) RESOURCE REQUEST ARBITRATION DEVICE, RESOURCE REQUEST ARBITRATION SYSTEM, RESOURCE REQUEST ARBITRATION METHOD, INTEGRATED CIRCUIT, AND PROGRAM

(75) Inventors: Hiroshi Amano, Osaka (JP); Daisuke Iwahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 475 days.

(21) Appl. No.: 13/821,392

(22) PCT Filed: Jul. 27, 2012

(86) PCT No.: PCT/JP2012/004800
§ 371 (c)(1),
(2), (4) Date: Mar. 7, 2013

(87) PCT Pub. No.: WO2013/038589
PCT Pub. Date: Mar. 21, 2013

(65) Prior Publication Data
US 2014/0006665 A1   Jan. 2, 2014

(30) Foreign Application Priority Data

Sep. 14, 2011   (JP) ................. 2011-200414

(51) Int. Cl.
*G06F 13/36* (2006.01)
*G06F 13/362* (2006.01)

(52) U.S. Cl.
CPC .................. *G06F 13/362* (2013.01)

(58) Field of Classification Search
CPC ...... G06F 13/36; G06F 13/362; G06F 13/364
USPC ......................................... 710/116
See application file for complete search history.

(56) References Cited

U.S. PATENT DOCUMENTS

| | | | |
|---|---|---|---|
| 6,845,419 B1 * | 1/2005 | Moyer | 710/264 |
| 7,062,582 B1 * | 6/2006 | Chowdhuri | 710/116 |
| 7,769,936 B2 * | 8/2010 | Mace | 710/113 |

(Continued)

FOREIGN PATENT DOCUMENTS

| | | |
|---|---|---|
| JP | 3-2949 | 1/1991 |
| JP | 3-263158 | 11/1991 |

(Continued)

OTHER PUBLICATIONS

International Search Report issued Nov. 6, 2012 in corresponding International Application No. PCT/JP2012/004800.

*Primary Examiner* — Brian Misiura
(74) *Attorney, Agent, or Firm* — Wenderoth, Lind & Ponack, L.L.P

(57) ABSTRACT

A resource request arbitration device is connected with each of a plurality of masters, and arbitrates transfer requests issued by the masters. The resource request arbitration device includes a plurality of counters each indicating a slack time of a transfer request issued by a master corresponding to the counter, and compares counter values stored in the counters by a tournament method, and specifies a master that has issued a transfer request having the highest priority. The resource request arbitration device grants access permission to the specified master to permit the specified master to use a slave.

10 Claims, 15 Drawing Sheets

(56) References Cited

U.S. PATENT DOCUMENTS

| | | | |
|---|---|---|---|
| 8,032,678 B2 * | 10/2011 | Tardieux et al. | 710/113 |
| 8,423,694 B2 * | 4/2013 | Naylor | 710/116 |
| 8,452,907 B2 * | 5/2013 | Riocreux | G06F 13/362 |
| | | | 710/200 |
| 8,521,933 B2 * | 8/2013 | Banerjee et al. | 710/111 |
| 2008/0235423 A1 | 9/2008 | Mace | |

FOREIGN PATENT DOCUMENTS

| | | |
|---|---|---|
| JP | 5-61818 | 3/1993 |
| JP | 2001-14271 | 1/2001 |
| JP | 2001-184299 | 7/2001 |
| JP | 2005-316609 | 11/2005 |
| JP | 2005-316866 | 11/2005 |
| JP | 2008-234659 | 10/2008 |
| WO | 2010/086906 | 8/2010 |

* cited by examiner

RESOURCE REQUEST ARBITRATION DEVICE, RESOURCE REQUEST ARBITRATION SYSTEM, RESOURCE REQUEST ARBITRATION METHOD, INTEGRATED CIRCUIT, AND PROGRAM

TECHNICAL FIELD

The present invention relates to an art of arbitrating resource requests issued by a plurality of resource request devices.

BACKGROUND ART

Conventionally, there have been developed a resource request arbitration device that enables a plurality of arbitration resource request devices such as a processor and a DMA (Direct Memory Access) controller to access a shared resource such as a bus and a unified memory. The resource request devices each issue a resource request to access the shared resource independently from the state of other of the resource request devices. When a plurality of resource request devices simultaneously issue respective resource requests, the resource request arbitration device performs so-called arbitration of setting a priority on each of the resource request devices, and granting access permission to a resource request device having the highest priority among the resource request devices. This prevents collision of accesses to the shared resource.

As basic arbitration methods, there have been known the fixed priority method and the round-robin method. According to the fixed priority method, a priority is fixedly set to each of a plurality of resource request devices. According to the round-robin method, access permission is granted in a cyclic order to a plurality of resource request devices thereby to ensure the fairness of access to a shared resource among the resource request devices.

Also, in order to manage QoS (Quality of Service) represented by a data transfer rate, the maximum queue time, or the like, there has also been known an art of determining a priority for each of a plurality of resource request devices based on progress data of process executed in the resource request device such as a queue time and a slack time of process (see Patent Literature 1 for example).

CITATION LIST

Patent Literature

[Patent Literature 1] Japanese Patent Application Publication No. 2008-234659

SUMMARY OF INVENTION

Technical Problem

According to the above art, comparison process by the bubble sort mechanism or the like is repeatedly performed on progress data in order to determine priorities of a plurality of resource request devices. This causes a problem that as the number of resource request devices that are arbitration targets increases, routing congestion in an arbitration circuit deteriorates and processing time increases.

The present invention was made in view of the above problem, and aims to provide a resource request arbitration device capable of easing routing congestion in an arbitration circuit and reducing processing time.

Solution to Problem

The present invention provides a resource request arbitration device that arbitrates requests for permission to access a shared resource that are issued by a plurality of resource request devices, the resource request arbitration device comprising: a plurality of counters that are provided in one-to-one correspondence with the resource request devices, and are each configured to, while a corresponding resource request device issues the request, repeatedly decrement a counter value stored therein, and when the permission is granted to the corresponding resource request device, increment the counter value by an increment value; a specification unit configured to compare the counter values stored in the counters with each other by a tournament method to specify a resource request device corresponding to a counter that stores therein a smallest counter value among the counter values stored in the counters; and a grant unit configured to grant the permission to the specified resource request device.

Advantageous Effects of Invention

According to the resource request arbitration device relating to the present invention, it is possible to ease routing congestion in an arbitration circuit and reduce processing time.

DESCRIPTION OF EMBODIMENTS

1. Embodiment 1

The following describes an embodiment of the present invention with reference to the drawings.

For simplifying descriptions, a resource request device is referred to as a master, and a shared resource is referred to as a slave. In the present embodiment, masters each issue an access request to access a slave via a system bus, and a resource request arbitration device arbitrates access requests for an access permission to access the slave via the system bus. Accordingly, in the present embodiment, the resource request arbitration device is also referred to as a bus arbiter, and the access permission is also referred to as a bus permission.

<1-1. Structure>

Figure 1:
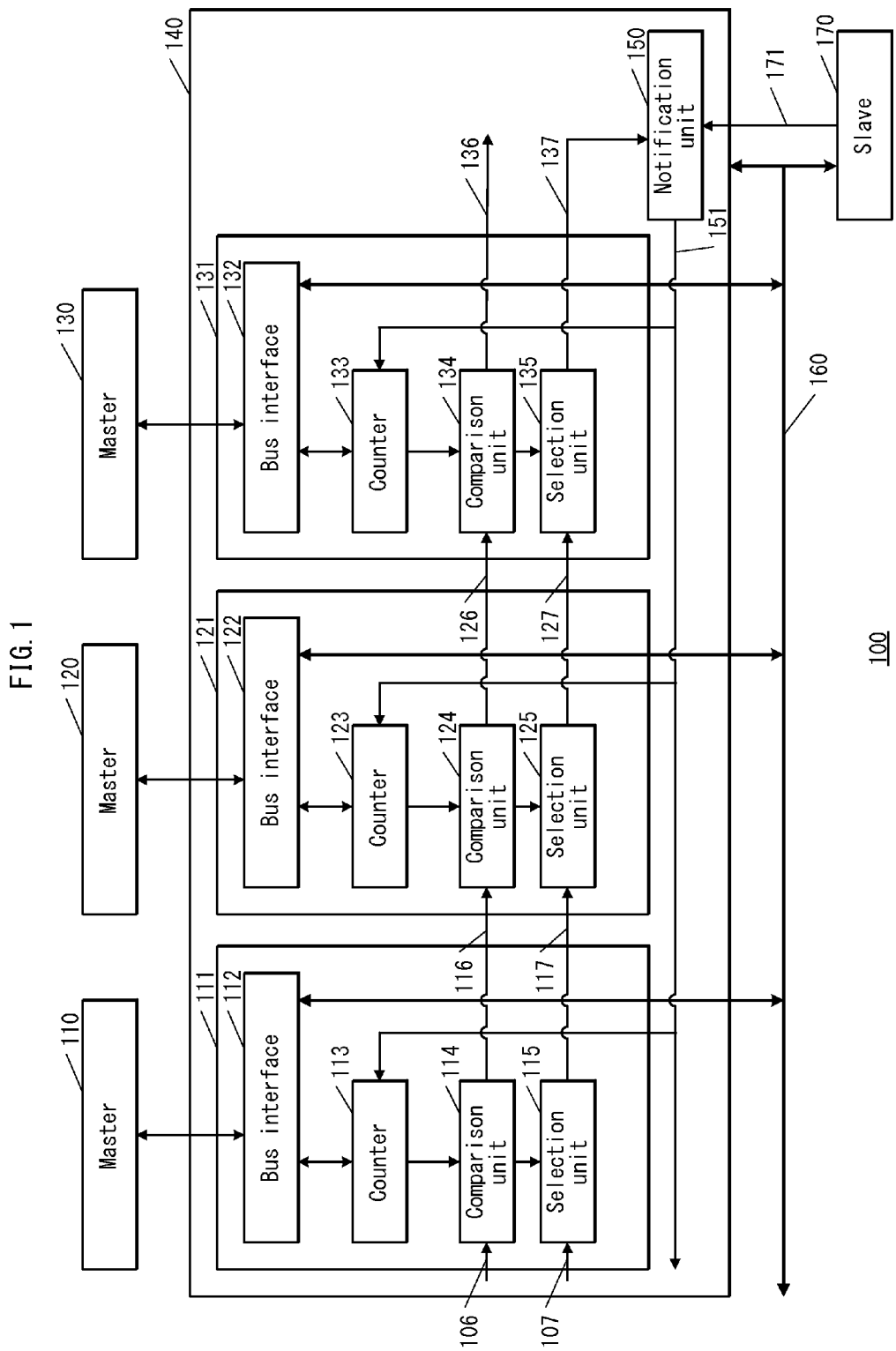
FIG. 1 is a block diagram showing the structure of a bus system relating to Embodiment 1.

FIG. 1 is a block diagram showing a bus system 100 relating to Embodiment 1. As shown in FIG. 1, the bus system 100 includes masters 110, 120, and 130, a bus arbiter 140, a system bus 160, and a slave 170.

The bus arbiter 140 is connected with the masters 110, 120, and 130, the system bus 160, and the slave 170. A structural element closer to the slave 170 is referred to as being downstream, and a structural element more distant from the slave 170 is referred to as being upstream. For example, the masters 120 and 130 are downstream from the master 110, and the masters 110 and 120 are upstream from the master 130.

The masters 110, 120, and 130 are each connected with the bus arbiter 140. In order to use the slave 170, the masters each issue a bus usage request to the bus arbiter 140, and stand by until the master acquires a bus permission. After acquiring the bus permission, the master reads and writes data from and to the slave 170 via the system bus 160.

The bus usage request issued to the bus arbiter 140 by the master is specifically a read/write transaction of a bus protocol used on the system bus 160. In the present embodiment, the bus usage request is the AXI (Advanced eXtensible Interface) protocol developed by ARM Limited, Cambridge, United Kingdom.

The slave 170 is connected with the bus arbiter 140 via a slave availability signal line 171, and notifies the bus arbiter 140 of whether the slave 170 can transfer data. Also, the slave 170 is connected with the system bus 160, and transfers data in accordance with a transaction command on the system bus 160.

The following describes the internal structure of the bus arbiter 140. The bus arbiter 140 includes sockets 111, 121, and 131 and a notification unit 150. The sockets 111, 121, and 131 include bus interfaces 112, 122, and 132, respectively, counters 113, 123, and 133, respectively, comparison units 114, 124, and 134, respectively and selection units 115, 125, and 135, respectively.

Also, the sockets 111, 121, and 131 are connected to each other in a daisy-chain topology via prioritized counter signal lines 106, 116, 126, and 136 and master identification signal lines 107, 117, 127, and 137. Furthermore, the notification unit 150 is connected with the master identification signal line that is the lowest downstream.

The bus interfaces 112, 122, and 132 are each connected with a corresponding master (hereinafter, referred to also as a target master) and the system bus 160. The bus interfaces 112, 122, and 132 each have a function of storing therein a bus usage request issued by the target master and a function of mediating between the target master to which a bus permission is granted and the system bus 160.

The counters 113, 123, and 133 each output a counter value stored therein to a corresponding comparison unit. In the present embodiment, the counter value indicates a slack time until a deadline of a bus usage request issued by a target master. While the target master issues the bus usage request, the counter repeatedly decrements the counter value. When the target master acquires a bus permission, the counter increments the counter value.

The comparison units 114, 124, and 134 each have a function of comparing a counter value stored in a counter corresponding to an upstream master input from an upstream prioritized counter signal line with a counter value stored in a counter corresponding to a target master, outputting a smaller one of the two counter values to a downstream prioritized counter signal line, and outputting comparison results to a corresponding selection unit.

In response to the input by the corresponding comparison unit, the selection units 115, 125, and 135 each select one of a master identification signal flowing on an upstream master identification signal line and a master identification signal identifying the target master, and output the selected master identification signal to a downstream master identification signal line. The selection units 115, 125, and 135 are for example each a multiplexer that receive, as a selection control input, an input made by the corresponding comparison unit.

Here, a signal input to the selection unit by the comparison unit is a one-bit signal indicating one of prioritization of the target master and selection of the upstream master. A master identification signal output by the selection unit indicates ID information for uniquely identifying each master connected with the bus arbiter 140.

Processing by the comparison unit and the selection unit is performed in order from the upstream to the downstream. Accordingly, the smallest counter value is output to the prioritized counter signal line 136 that is the lowest downstream, and a master identification signal identifying a master corresponding to the smallest counter value is output to the master identification signal line 137 that is the lowest downstream.

A counter value flowing on the prioritized counter signal line 106 that is the highest upstream should be greater than the respective counter values stored in all the counters. In the present embodiment, the counter value flowing on the prioritized counter signal line 106 is the greatest counter value storable in the counters. Also, a master identification signal flowing on the master identification signal line 107 identifies none of the masters.

The notification unit 150 outputs a master identification signal, which is input from the master identification signal line 137, to each counter via the arbitration result notification signal line 151.

The bus arbiter 140 causes the notification unit 150 to notify a bus interface corresponding to the counter of the arbitration results via the counter, and permits the master corresponding the bus interface to use the system bus 160, thereby to grant a bus permission to the master.

<1-2. Operations>

The following describes operations of the bus system 100 relating to Embodiment 1. Since the sockets 111, 121, and 131 perform the same operations, description is provided here only on operations of the structural elements corresponding to the socket 111.

Figure 2:
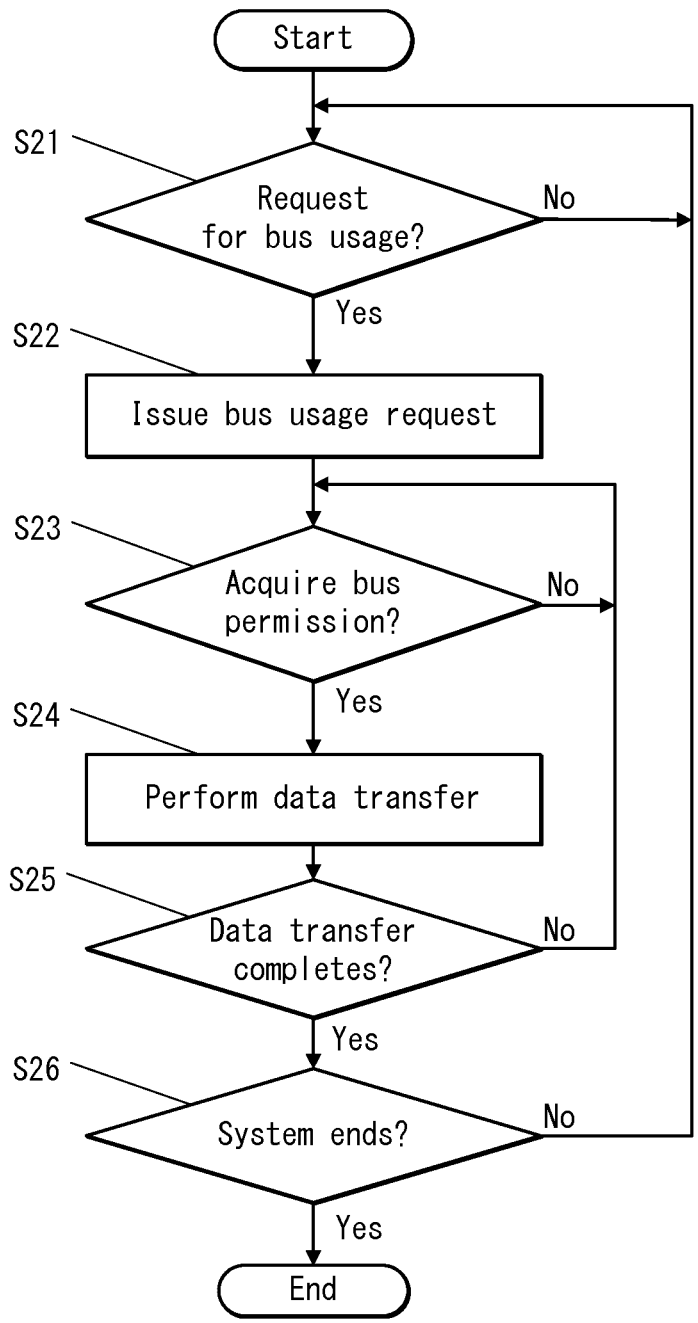
FIG. 2 is a flowchart showing operations of a master relating to Embodiment 1.

FIG. 2 is a flowchart showing operations of the master 110 relating to Embodiment 1. The master 110 is in a standby state as an initial state, and stands by until bus usage is requested (Step S21).

When bus usage is requested while the master 110 is in the standby state, the master 110 issues a bus usage request to the bus arbiter 140 (Step S22), and transits to a transfer standby state.

In the transfer standby state, the master 110 stands by until the master 110 is permitted to use the system bus 160 (Step S23). When permitted to use the system bus 160 in the transfer standby state, the master 110 performs data transfer with the slave 170 (Step S24). Also, the master 110 judges whether the data transfer in Step S24 is complete (Step S25). If the data transfer is not yet complete, the master 10 returns to Step S23.

When the data transfer is complete, the master 110 transits to the standby state, and judges whether the system ends (Step S26). When the system does not end, the master 110 returns to Step S21. When the system ends, the master 10 ends the processing.

Here, the judgment as to completion of the data transfer in Step S25 may be made differently between a read transaction and a write transaction. In the present embodiment, for the read transaction, when the master 110 completes issuing to an address channel of AXI, it is judged that data transfer is complete. Also, for the write transaction, when the master 110 completes issuing of data in which WLAST signal is asserted to a write channel of AXI, it is judged that data transfer is complete.

Figure 3:
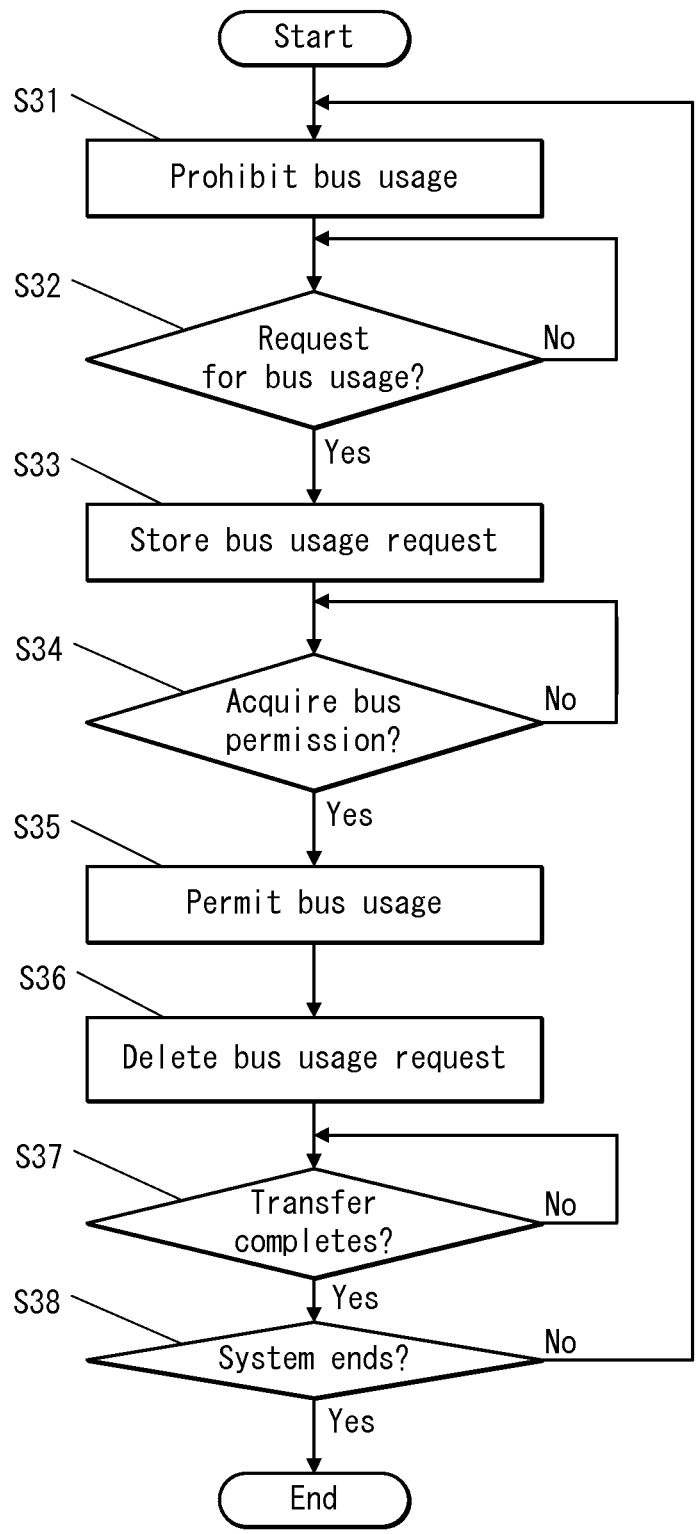
FIG. 3 is a flowchart showing operations of a bus interface relating to Embodiment 1.

FIG. 3 is a flowchart showing operations of the bus interface 112. The bus interface 112 is in a transfer prohibition state as an initial state. The bus interface 112 prohibits the master 110 from using the system bus 160 (Step S31), and stands by until the master 110 issues a bus usage request (Step S32).

When a bus usage request is issued by the master 110 while the bus interface 112 is in the transfer prohibition state, the bus interface 112 transit to a bus permission waiting state, and stores therein the bus usage request (Step S33). The bus interface 112 outputs a request signal to the counter 113 until the master 110 acquires a bus permission (Step S34).

When the counter 113 outputs a signal indicating that the master 110 has acquired the bus permission while the bus interface 112 is in the bus permission waiting state, the bus interface 112 transits to the transfer permission state. The bus interface 112 permits the master 110 to use the system bus 160 (Step S35), and delete the bus usage request stored therein (Step S36).

While in the transfer permission state, the bus interface 112 monitors the channels on the system bus 160, and stands by until the master 110 completes using the system bus 160 (Step S37).

When the data transfer is complete, the bus interface 112 transits to the transfer prohibition state, and judges whether the system ends (Step S38). When the system does not end, the bus interface 112 returns to Step S31. When the system ends, the bus interface 112 ends the processing.

Figure 4:
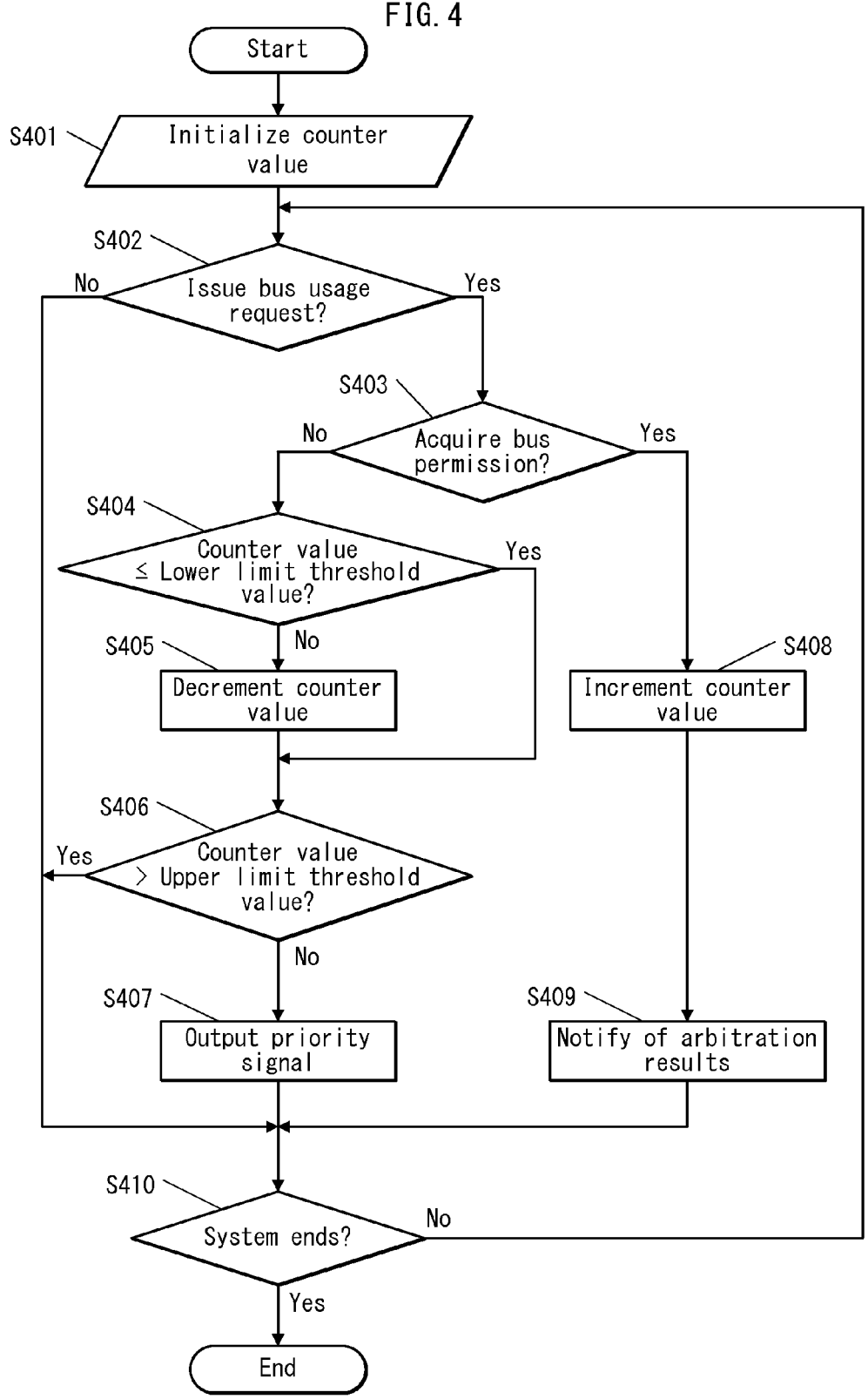
FIG. 4 is a flowchart showing operations of a counter relating to Embodiment 1.

FIG. 4 is a flowchart showing operations of the counter 113. As shown in FIG. 4, the counter 113 sets an initial value for a counter value c1 (Step S401). In the present embodiment, the initial value is, for example, a throughput interval T1 based on a bandwidth requested by the master 110.

Here, the bandwidth requested by the master indicates a data transfer rate requested by the master, that is, a data amount requested per unit time by the master. The bandwidth requested by the master, is, for example, represented by a product of a data amount per request and the number of requests per unit time. Also, the throughput interval of the master indicates an average processing time of data per request (clock count), and is equivalent to an average request interval where the master issues a bus usage request.

Next, the counter 113 judges whether the master 110 issues a bus usage request, that is, whether the bus interface 112 outputs a request signal (Step S402).

When the master 110 issues the bus usage request (Step S402: Yes), the counter 113 further judges whether the master 110 has acquired a bus permission, that is, whether the notification unit 150 outputs a master identification signal identifying the master 110 via the arbitration result notification signal line 151 (Step S403).

When the master 110 has not acquired the bus permission (Step S403: No), the counter 113 compares the counter value c1 with a predetermined lower limit threshold value (Step S404). When the counter value c1 is greater than the lower limit threshold value, the counter 113 decrements the counter value c1 (Step S405). When the counter value c1 is equal to or smaller than the lower limit threshold value, the counter 113 does not decrement the counter value c1, and proceeds with the processing. When the counter value c1 reaches the lower limit threshold value, the counter 113 terminates decrementing the counter value c1 so as to prevent the counter value c1 from being an invalid value. In the present embodiment, the lower limit threshold value is zero.

Next, the counter 113 compares the counter value c1 with a predetermined upper limit threshold value (Step S406). When the counter value c1 is equal to or smaller than the upper limit threshold value, the counter 113 outputs, to the comparison unit 114, a priority signal indicating that the bus usage request issued by the master 110 should be prioritized (Step S407). When the counter value c1 is greater than the upper limit threshold value, that is, when there is an enough time until a deadline of the bus usage request issued by the master 110 (Step S406: Yes), the counter 113 does not output the priority signal so as to prioritize a bus usage request issued by other master. In the present embodiment, the upper limit threshold value is equivalent to the throughput interval T1 described above.

When the master 110 has acquired the bus permission in Step S403 (Step S403: Yes), the counter 113 increments the counter value c1 by an increment value (Step S408). In the present embodiment, the increment value is equivalent to the throughput interval T1 described above.

Then, the counter 113 outputs a signal indicating that the master 110 has acquired the bus permission to the bus interface 112 (Step S409).

When one of the following is satisfied, the counter 113 judges whether the system ends (Step S410): when the master 110 does not issue a bus usage request (Step S402: No); when the counter value c1 is greater than the upper limit threshold value (Step S406: Yes); when the processing of Step S407 is complete; and when the processing of Step S409 is complete. When the system does not end, the counter 113 returns to Step S402. When the system ends, the counter 113 ends the processing.

The processing of Steps S402 to S409 shown in FIG. 4 is performed for one clock cycle. While a request signal is output by the bus interface 112, the counter value c1 stored in the counter 113 is decremented per clock cycle. When the counter value c1 does not exceed the upper limit threshold value, a priority signal is output to the comparison unit 114.

Note that the counter value c1 stored in the counter 113 is always output to the comparison unit 114. The bus arbiter 140 judges whether the master 110 corresponding to the counter 113 is an arbitration target depending on whether a priority signal is output by the counter 113.

Figure 5:
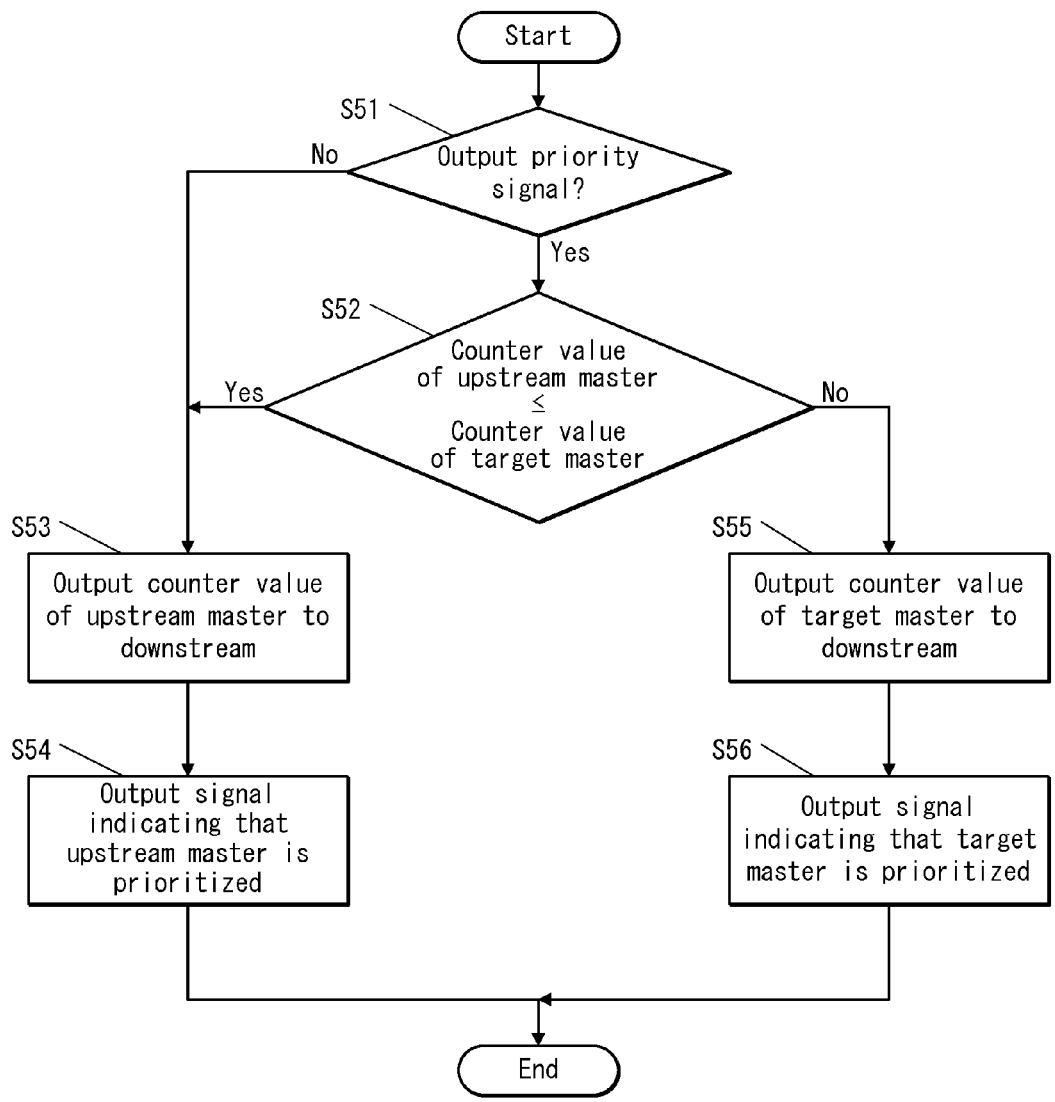
FIG. 5 is a flowchart showing operations of a comparison unit relating to Embodiment 1.

FIG. 5 is a flowchart showing operations of the comparison unit 114. The comparison unit 114 judges whether a priority signal is output by the counter 113 (Step S51). When the priority signal is not output by the counter 113, the comparison unit 114 proceeds to Step S53 to perform processing of prioritizing an upstream master.

When the priority signal is output by the counter 113 (Step S51: Yes), the comparison unit 114 inputs a counter value corresponding to an upstream master, specifically, a counter value c0 of the prioritized counter signal line 106, and a counter value corresponding to a target master, specifically, a counter value stored in the counter 113 corresponding to the master 110. The comparison unit 114 compares the two counter values with each other to judge which one of the two counter values is smaller (Step S52).

When the counter value corresponding to the upstream master is equal to or smaller than the counter value corresponding to the target master (Step S52: Yes), the comparison unit 114 outputs the counter value c0 of the prioritized counter signal line 106 to the prioritized counter signal line 116 (Step S53). Then, the comparison unit 114 outputs a signal indicating that the upstream master should be prioritized to the selection unit 115 (Step S54).

When the counter value corresponding to the upstream master is greater than the counter value corresponding to the target master (Step S52: No), the comparison unit 114 outputs the counter value c1 stored in the counter 113 to the prioritized counter signal line 116 (Step S55). Then, the comparison unit 114 outputs a signal indicating that the target master should be prioritized to the selection unit 115 (Step S56).

In response to input by the comparison unit 114, the selection unit 115 outputs a master identification signal to the master identification signal line 117. Specifically, when the signal input by the comparison unit 114 indicates that the upstream master should be prioritized, the selection unit 115 outputs a master identification signal flowing on the master identification signal line 107 to the master identification signal line 117. When the signal input by the comparison unit 114 indicates that the target master should be prioritized, the selection unit 115 outputs a master identification signal identifying the master 110 to the master identification signal line 117.

Figure 6:
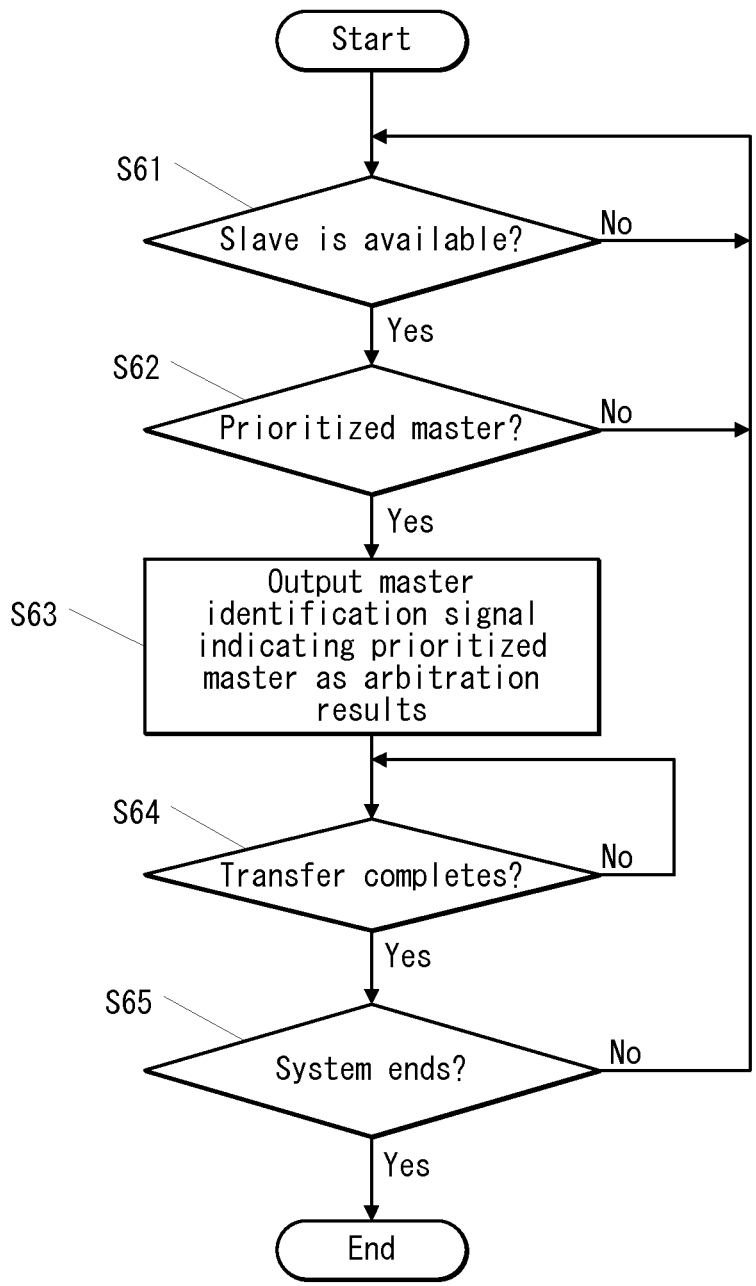
FIG. 6 is a flowchart showing operations of a notification unit relating to Embodiment 1.

FIG. 6 is a flowchart showing operations of the notification unit 150. The notification unit 150 is in a standby state as an initial state. The notification unit 150 stands by, until the slave 170 outputs a slave availability signal via the slave availability signal line 171 (Step S61) and the master identification signal line 137 outputs a master identification signal identifying any one of the masters (Step S62).

The slave availability signal is output at throughput intervals Ts based on a transfer bandwidth of the slave 170, for example. Here, the transfer bandwidth of the slave is a data transfer rate of the slave, that is, a data amount transferred per unit time by the slave. The transfer bandwidth of the slave is, for example, represented by a product of a data amount per transfer and the number of transfers per unit time. Also, the throughput interval of the slave indicates an average processing time of data per transfer (clock count), and is equivalent to an average arbitration interval where the bus arbiter 140 performs arbitration.

When both a slave availability signal and a master identification signal identifying any one of the masters are input while the notification unit 150 is in the standby state, the notification unit 150 transits to a bus monitoring state. Then, the notification unit 150 outputs, as arbitration results, the master identification signal flowing on the master identification signal line 137 to the arbitration result notification signal line 151 (Step S63).

While in the bus monitoring state, the notification unit 150 monitors the channels on the system bus 160, and stands by until the master that has acquired the bus permission completes using the system bus 160 (Step S64).

When transfer is complete, the notification unit 150 transits to the standby state, and judges whether the system ends (Step S65). When the system does not end, the notification unit 150 returns to Step S61. When the system ends, the notification unit 150 ends the processing.

Through the operations shown in FIG. 2 to FIG. 6 as described above, in response to a bus usage request from each of the masters, the bus arbiter 140 notifies of arbitration results at the throughput intervals Ts of the slave 170.

<1-3. Consideration>

Next, description is provided on the relation between the transfer bandwidth of the slave and the bandwidth requested by each of the masters 110, 120, and 130 in the bus system 100 relating to the present embodiment.

When the throughput interval of the slave is Ts clk, the operation frequency of the bus system is F MHz, and the data transfer unit is C byte for example, the transfer bandwidth of the slave is calculated as follows.

$$\text{Transfer bandwidth of slave} = C \times F \div Ts \text{ byte/s}$$

Also, when the respective throughput intervals of the masters 110, 120, and 130 are T1 clk, T2 clk, and T3 clk, the respective bandwidths requested by the masters 110, 120, and 130 are calculated as follows.

$$\text{Bandwidth requested by master } 110 = C \times F \div T1 \text{ byte/s}$$

$$\text{Bandwidth requested by master } 120 = C \times F \div T2 \text{ byte/s}$$

$$\text{Bandwidth requested by master } 130 = C \times F \div T3 \text{ byte/s}$$

In order to satisfy the bandwidths requested by all the masters, the transfer bandwidth of the salve needs to be a value greater than the total sum of the bandwidths requested by all the masters.

Transfer bandwidth of slave≥Bandwidth requested by master 110+Bandwidth requested by master 120+Bandwidth requested by master 130 In other words, the following constraints for band need to be satisfied.

$$C \times F \div Ts \geq C \times F \div T0 + C \times F \div T1 + C \times F \div T2$$

$$1/Ts \geq 1/T0 + 1/T1 + 1/T2$$

In other words, when the constraints for band are satisfied, the bus usage request issued by each of the masters is accepted until the deadline, and the masters 110, 120, 130 can use a bandwidth of $C \times F \div T1$, a bandwidth of $C \times F \div T2$, and a bandwidth of $C \times F \div T3$, respectively. In other words, the bus arbiter 140 can manage the QoS based on the bandwidths requested by the masters.

<1-4 Summary>

The bus arbiter 140 relating to Embodiment 1 compares the counter values stored in the counters one-to-one corresponding to the masters 110, 120, and 130 in the order from the upstream by the tournament method, specifies one of the masters corresponding to the counter that stores therein the smallest counter value, and grant a bus permission to the specified master. With this structure, the number of comparisons is equal to the number of masters connected with the bus arbiter 140. Accordingly, compared with sorting by the bubble sort mechanism or the like, it is possible to reduce both the routing congestion on the arbitration circuit and the increase in processing time that are caused by the increase in number of masters.

Also, according to the bus arbiter 140 relating to Embodiment 1, a throughput interval different for each master is set to each of the initial value and the increment value of a counter value stored in a counter corresponding to the master. All the counters each decrement the counter value at a common speed, namely, decrement the counter value per clock cycle. With this structure, it is possible to arbitrate bus usage requests from the masters in accordance with the bandwidth requested by the master, that is, to manage the QoS of the master.

Furthermore, according to the bus arbiter 140 relating to Embodiment 1, when a counter value stored in a counter corresponding to a target master is greater than the predetermined upper limit threshold value, a priority signal is not output (Steps S406 and S407 in FIG. 4), the comparison unit makes no comparison, and processing of prioritizing an upstream master is performed (Step S51 in FIG. 5). In other words, the bus arbiter 140 does not grant a bus permission to a master corresponding to a counter that stores therein a counter value greater than the upper limit threshold value. With this structure, when a counter value is greater than the upper limit threshold value, the counter value is not incremented. This ensures that a counter value stored in each counter is incremented or decremented within a valid range.

2. Embodiment 2

The following describes a bus system 700 relating to an embodiment of the present invention. In Embodiment 1, a counter value stored in a counter corresponding to each of the masters 110, 120, and 130 is used, with no modification, as a priority of a corresponding master for comparison. Embodiment 2 differs from Embodiment 1 in that a counter value stored in a counter corresponding to each of the masters is normalized to a level signal whose bit width is smaller than a bit width of the corresponding counter, and the level signal is used as a priority of the master. Structural elements in Embodiment 2 that are the same as those in Embodiment 1 have the same numeral references, and description thereof is omitted.

<2-1. Structure>

Figure 7:
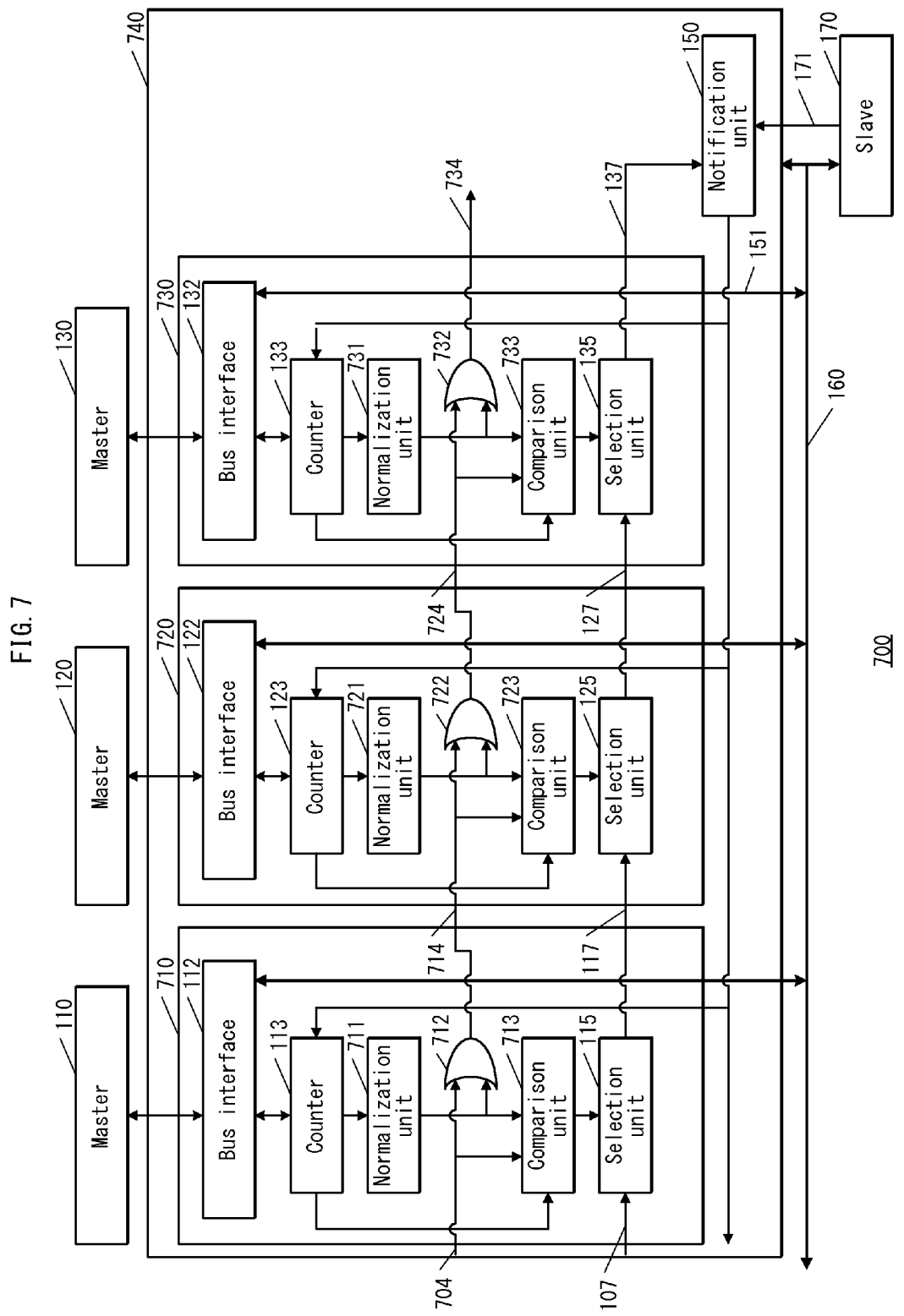
FIG. 7 is a block diagram showing the structure of a bus system relating to Embodiment 2.

FIG. 7 is a block diagram showing the bus system 700 relating to Embodiment 2. As shown in FIG. 7, a bus arbiter 740 includes sockets 710, 720, and 730 instead of the sockets 111, 121, and 131 included in the bus arbiter 140 relating to Embodiment 1. In addition to the structural elements included in the sockets 111, 121, and 131, the sockets 710, 720, and 730 include normalization units 711, 721, and 731, respectively, calculation units 712, 722, and 732, respectively, comparison units 713, 723, and 733, respectively, which differ in operations from the comparison units 114, 124, and 134 included in the bus arbiter 140.

Also, the sockets 710, 720, and 730 are connected to each other in a daisy-chain topology via request level signal lines 704, 714, 724, and 734 and master identification signal lines 107, 117, 127, and 137. Furthermore, the notification unit 150 is connected with the master identification signal line that is the lowest downstream.

The normalization units 711, 721, and 731 each receive a counter value stored in a corresponding counter, and normalize the counter value to a level value whose depth is smaller than a bit width of the counter. Then, normalization units each output a level signal having an active bit only at a bit position corresponding to the level value. The bit width of the level signal is equal to the depth of the level value. For example, when the level value is K and the depth of the level value is N (where K<N), the normalization unit outputs a level signal having an active bit only at the K-th position from the least significant position among N bit positions.

Here, the depth of the level value indicates the number of levels. Also, processing of normalizing a counter value stored in a counter to a level value whose depth is smaller than a bit width of the counter is referred to as normalization processing. Processing of generating a level signal having an active bit only at a single bit position corresponding to the level value is referred to as one-hot level signal generation processing.

The calculation units 712, 722, and 732 each receive a level signal output by a corresponding normalization unit and a level signal flowing on a upstream request level signal line, perform a bitwise OR operation on the two level signals, and output a result of the bitwise OR operation to a downstream request level signal line.

In the present embodiment, a level signal flowing on the request level signal line 704 that is the highest upstream is grounded. The level signal output by the normalization unit 711 is output to the request level signal line 714.

The comparison units 713, 723, and 733 each receive a level signal output by a corresponding normalization unit and a level signal flowing on an upstream request level signal line, compare the two level signals with each other, and output a signal indicating which one of a target master and an upstream master should be prioritized to a corresponding selection unit.

<2-2. Operations>

The following describes operations of the bus system 700 relating to Embodiment 2. Since the sockets 710, 720, and 730 perform the same operations, description is provided here on operations of the normalization unit 711, the calculation unit 712, and the comparison unit 713 corresponding to the socket 710.

Figure 8:
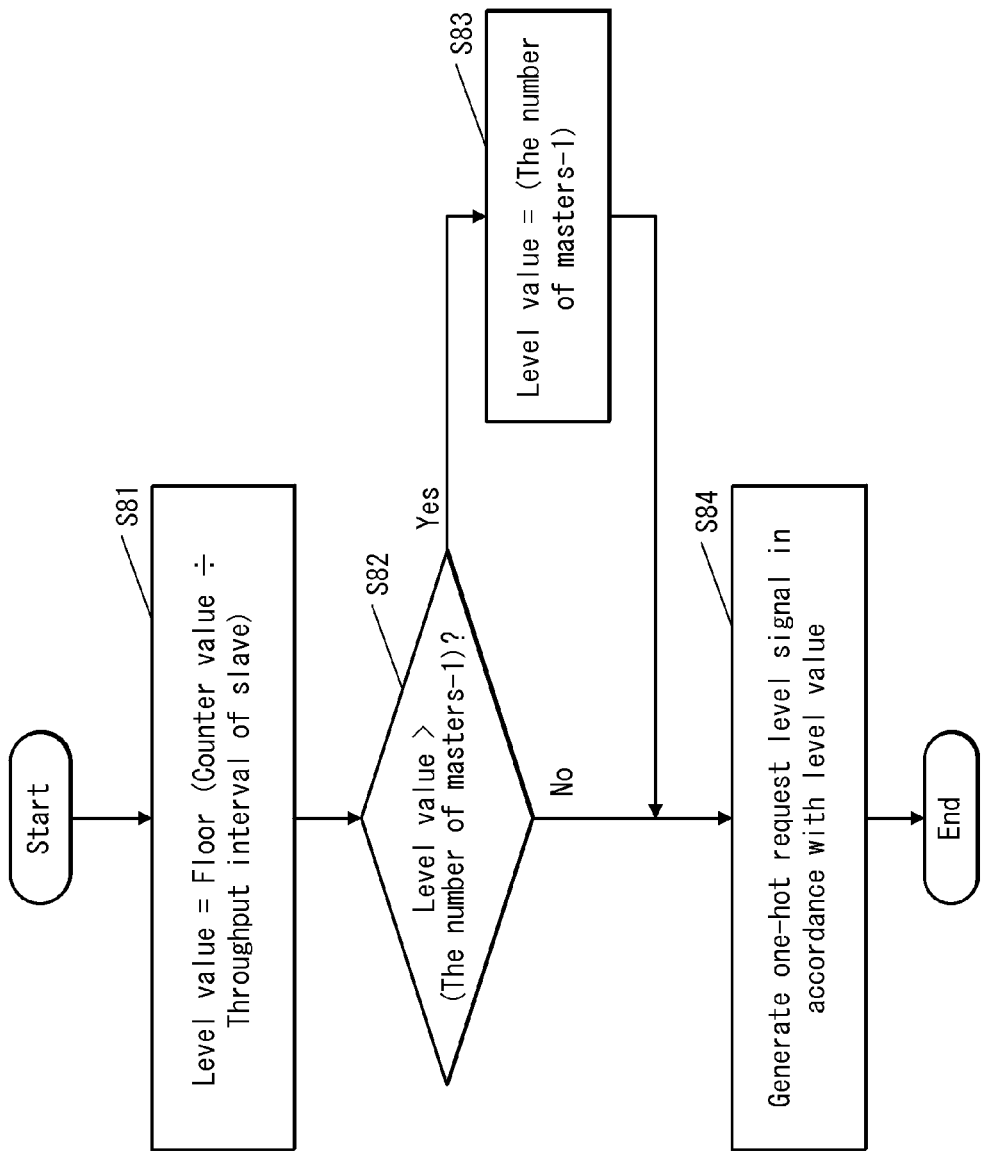
FIG. 8 is a flowchart showing operations of a normalization unit relating to Embodiment 2.

FIG. 8 is a flowchart showing operations of the normalization unit 711. As shown in FIG. 8, the normalization unit 711 normalizes the counter value c1 stored in the counter 113 to a level value L1=Floor(c1/Ts) with use of a throughput interval Ts of the slave 170 (Step S81). Here, Floor(x) is a greatest integer that is equal to or smaller than x that is a real number.

The level value L1 is a quotient of the counter value c1 by the throughput interval Ts of the slave 170. That is, the level value L1 indicates the number of arbitrations performed by the bus arbiter 740 until the counter value stored in the counter 113 reaches zero.

Next, the normalization unit 711 compares the level value L1 with the number of masters N connected with the bus arbiter 740 (Step S82). When L1>(N−1) is satisfied, the normalization unit 711 sets L1=(N−1) (Step S83).

After calculating the level value L1, the normalization unit 711 generates a one-hot request level signal whose bit width is equal to the number of masters N and having an active bit only at a single bit position corresponding to the calculated level value L1. Then, the normalization unit 711 outputs the generated request level signal to the calculation unit 712 and the comparison unit 713 (Step S84).

As a result of the processing in Step S83, the depth of the level value L1 is equal to the number of masters N, and accordingly it is possible to suppress the bit width of the level signal generated in Step S84 up to the number of masters N independently from the bit width of the counter 113.

The number of the masters N is three in the present embodiment, and accordingly the level value L1 is zero, one, or two. When the level value L1 is zero, the request level signal has a value of 001. When the level value L1 is one, the request level signal has a value of 010. When the level value L1 is two, the request level signal has a value of 100.

Figure 9:
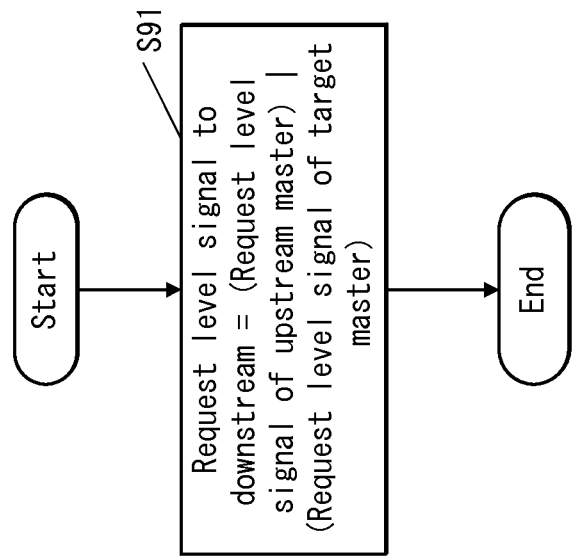
FIG. 9 is a flowchart showing operations of a calculation unit relating to Embodiment 2.

FIG. 9 is a flowchart showing operations of the calculation unit 712. As shown in FIG. 9, the calculation unit 712 receives a level signal output by the normalization unit 711 and a level signal flowing on the request level signal line 704, performs a bitwise OR operation on the two level signals, and outputs a result of the bitwise OR operation to the request level signal line 714 (Step S91).

Figure 10:
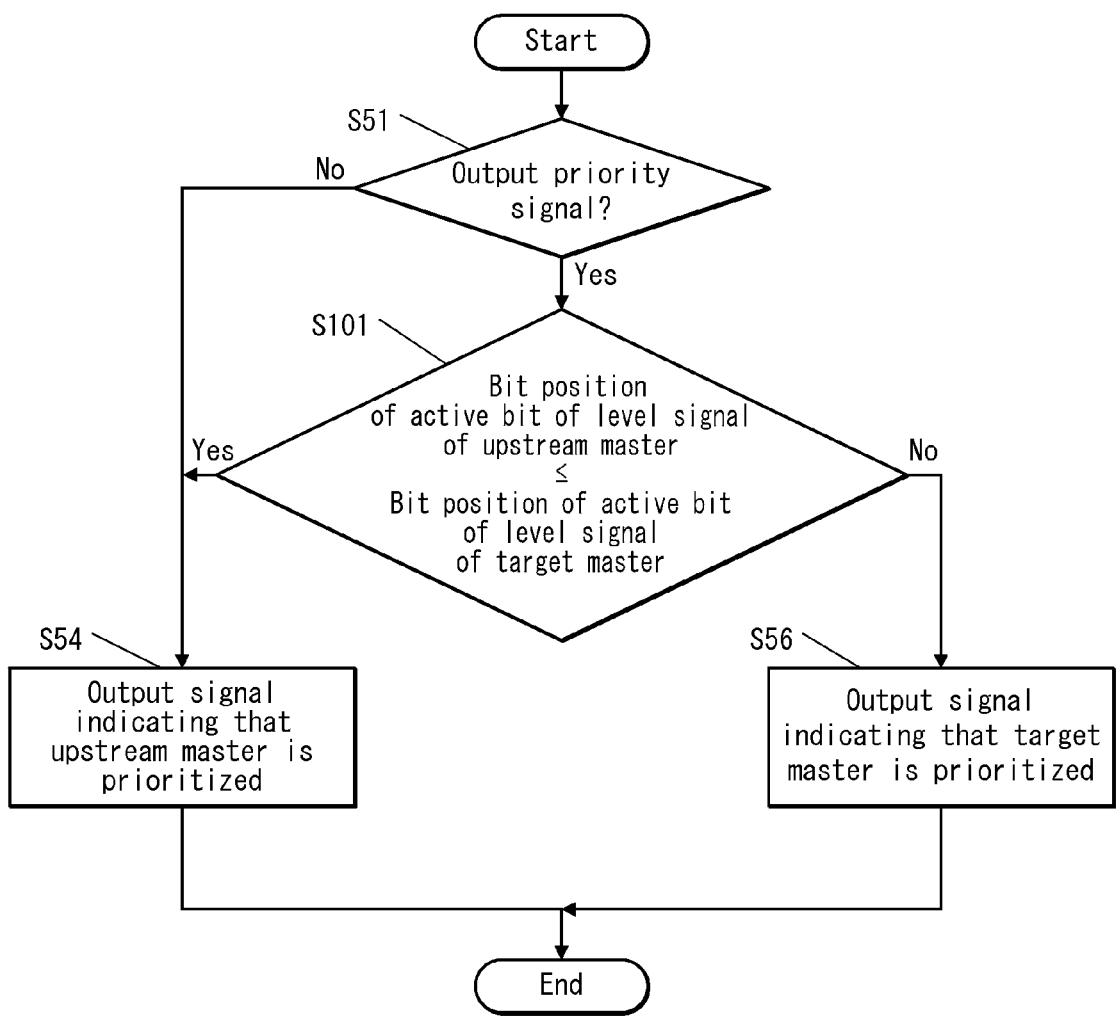
FIG. 10 is a flowchart showing operations of a comparison unit relating to Embodiment 2.

FIG. 10 is a flowchart showing operations of the comparison unit 713. As shown in FIG. 10, the comparison unit 713 judges whether a priority signal is output by the counter 113 (Step S51). When the priority signal is not output by the counter 113, the comparison unit 713 proceeds to Step S54.

When the priority signal is output by the counter 113 (Step S51: Yes), the comparison unit 713 receives a level signal corresponding to an upstream master, specifically, a level signal flowing on the request level signal line 704, and a level signal corresponding to a target master, specifically, a level signal output by the normalization unit 711. The comparison unit 713 compares the two level signals with each other to specify which one of the level signals has an active bit at a less significant position (Step S101).

When the zero or more bit positions of active bits of the level signals corresponding to the upstream masters are equal to or less significant than the bit position of an active bit of the level signal corresponding to the target master (Step S101: Yes), the comparison unit 713 outputs a signal indicating that the upstream master should be prioritized to the selection unit 115 (Step S54).

When the zero or more bit positions of the active bits of the level signals corresponding to the upstream masters are more significant than the bit position of the active bit of the level signal corresponding to the target master (Step S101: No), the comparison unit 713 outputs a signal indicating that the corresponding master should be prioritized to the selection unit 115 (Step S56).

<2-4 Summary>

The bus arbiter 740 relating to Embodiment 2 normalizes a counter value stored in a counter to a level value whose depth is smaller than a bit width of the counter, and makes comparison using the level value as a priority of a master corresponding to the counter. With this structure, compared with Embodiment 1 where the counter value is used for comparison without modification, it is possible to reduce the number of wirings of comparison circuits to ease the routing congestion on the arbitration circuit.

Also, the bus arbiter 740 relating to Embodiment 2 performs a bitwise OR operation on a one-hot level signal and a level signal flowing on an upstream request level signal line, and output a result of the bitwise OR operation to a downstream request level signal line. With this structure, by simply performing a bitwise OR operation, it is possible to propagate a level signal from the upstream to the downstream, without loss of information necessary to make judgment as to priority. This enables all the comparison units to perform the operations in parallel thereby to suppress the number of logical steps in the arbitration circuit. As a result, the length of a wiring available for one clock cycle is increased, and accordingly it is possible to flexibly design the arbitration circuit.

3. Embodiment 3

The following describes a bus system 1100 that is an embodiment of the present invention. In Embodiment 1, in the case where any error occurs in a counter, specifically in the case where a counter value stored in the counter falls below the lower limit threshold value for example, saturation processing is performed. In Embodiment 3, in the case where any error occurs in a counter, the counter is initialized. Structural elements in Embodiment 3 that are the same as those in Embodiment 1 have the same numeral references, and description thereof is omitted.

<3-1. Structure>

Figure 11:
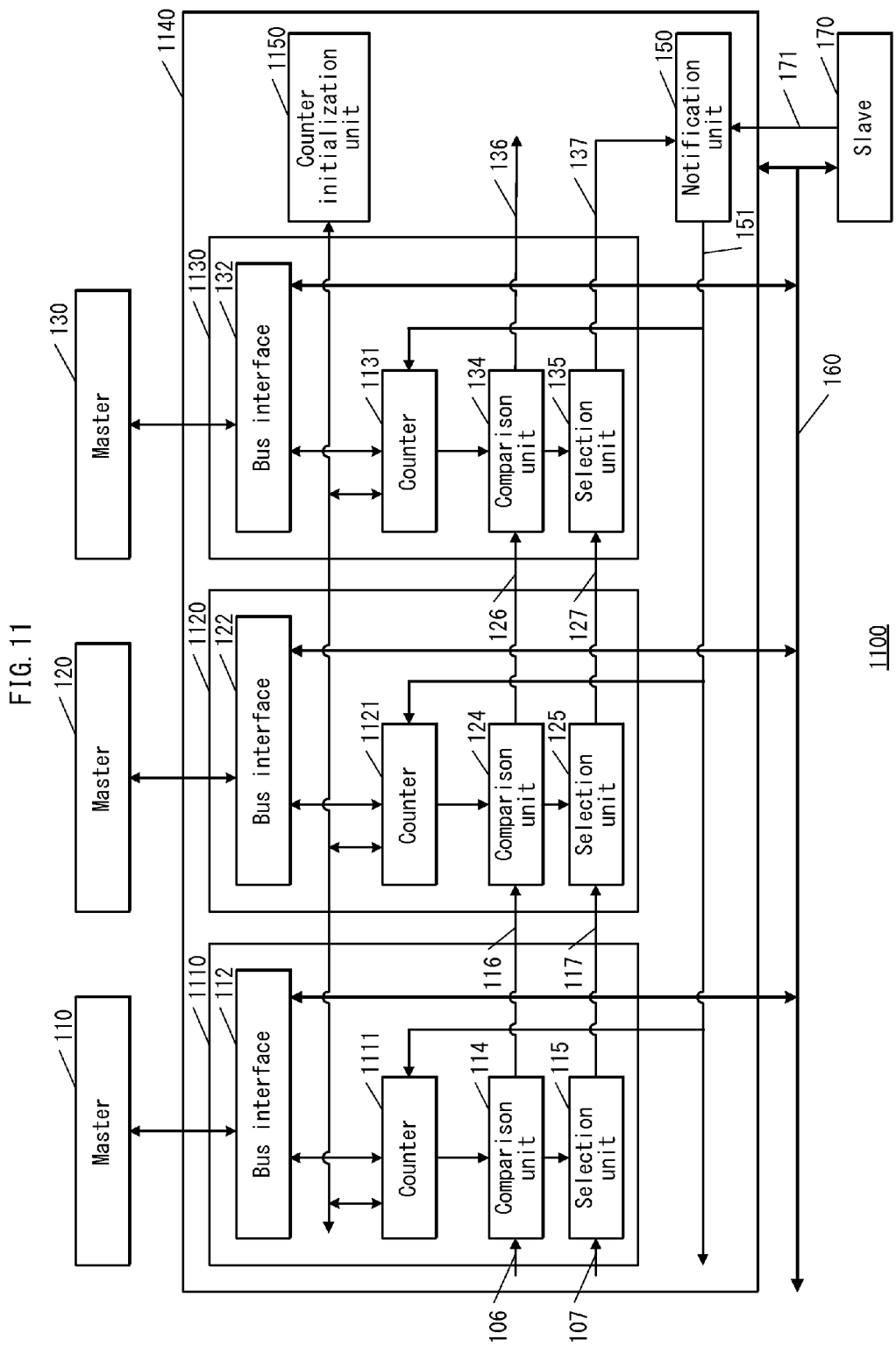
FIG. 11 is a block diagram showing the structure of a bus system relating to Embodiment 3.

FIG. 11 is a block diagram showing the bus system 1100 relating to Embodiment 3. As shown in FIG. 11, the bus system 1100 differs in structure from the bus system 1000 relating to Embodiment 1 in the following points. Specifically, a bus arbiter 1140 includes a counter initialization unit 1150, sockets 1110, 1120, and 1130 instead of the sockets 111, 121, and 131, and counters 1111, 1121, and 1131 instead of the counters 113, 123, and 133.

The counter initialization unit 1150 is connected with each of the counters. When a counter error detection signal is output by any of the counters, the counter initialization unit 1150 outputs a counter initialization signal to each of all the counters.

In addition to the functions of the counters relating to Embodiment 1, the counters 113, 123, and 133 each have a function of outputting a counter error detection signal to the counter initialization unit 1150 in response to occurrence of an error in a counter value stored therein and a function of initializing the counter value in response to output of a counter initialization signal by the counter initialization unit 1150.

<3-2. Operations>

The following describes operations of the counters 1111, 1121, and 1131 that are different from those relating to Embodiment 1 and the counter initialization unit 1150. Since the counters 1111, 1121, and 1131 perform the same operations, description is provided on only the counter 1111, and description on the counters 1121 and 1131 is omitted here.

Figure 12:
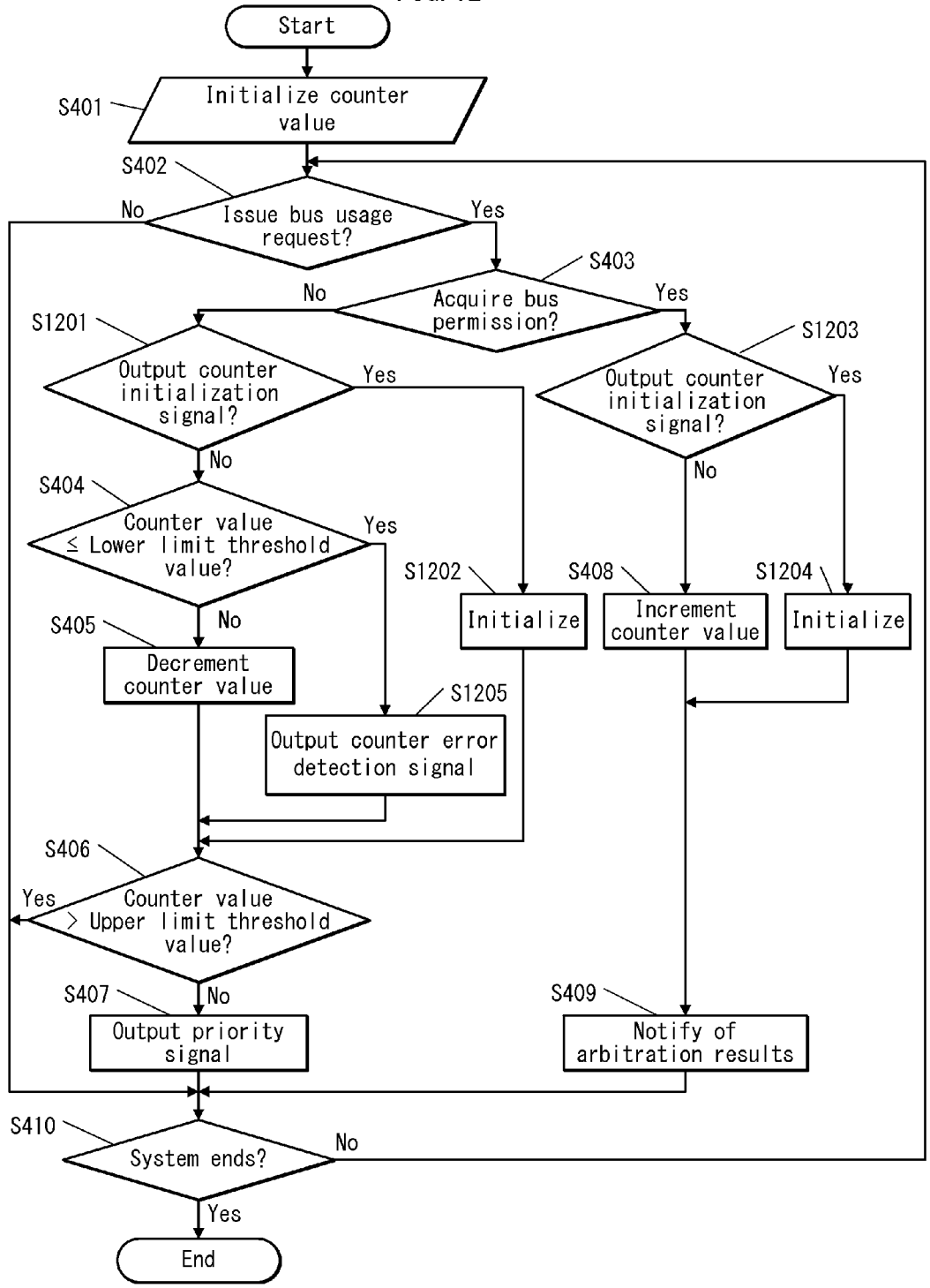
FIG. 12 is a flowchart showing operations of a counter relating to Embodiment 3.

FIG. 12 is a flowchart showing the operations of the counter 1111 relating to Embodiment 3. As shown in FIG. 12, before comparing the counter value c1 with the lower limit threshold value in Step S404, the counter 1111 judges whether a counter initialization signal is output by the counter initialization unit 1150 (Step S1201), in addition to the operations of the counter relating to Embodiment 1. When the counter initialization signal is output by the counter initialization unit 1150, the counter 1111 initializes the counter value c1 (Step S1202). Then, the counter 1111 proceeds to Step S406 to perform processing.

Also, before incrementing the counter value c1 by an increment value in Step S408, the counter 1111 judges whether a counter initialization signal is output by the counter initialization unit 1150 (Step S1203). When the counter initialization signal is output by the counter initialization unit 1150, the counter 1111 initializes the counter value c1 (Step S1204). Then, the counter 1111 proceeds to Step S409 to perform processing.

Furthermore, when comparison results show that the counter value c1 and the lower limit threshold value are equal to each other (Step S404: Yes), the counter 1111 outputs a counter error signal to the counter initialization unit 1150 (Step S1205).

Figure 13:
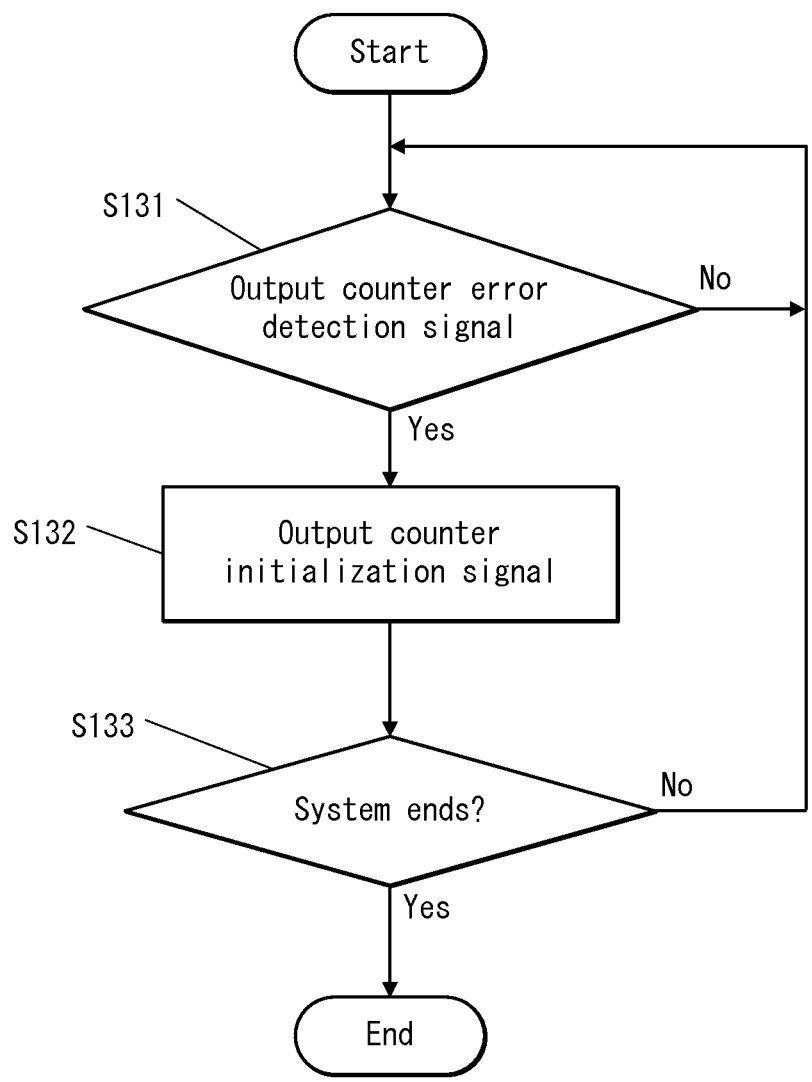
FIG. 13 is a flowchart showing operations of a counter initialization unit relating to Embodiment 3.

FIG. 13 is a flowchart showing operations of the counter initialization unit 1150. As shown in FIG. 13, the counter initialization unit 1150 judges whether a counter error detection signal is output any of the counters (Step S131). When no counter error detection signal is output, the counter initialization unit 1150 stands by until a counter error detection signal is output.

When a counter error detection signal is output by any of the counters, the counter initialization unit 1150 outputs a counter initialization signal (Step S132).

After outputting the counter initialization signal, the counter initialization unit 1150 judges whether the system ends (Step S133). When the system does not end, the counter initialization unit 1150 returns to Step S131. When the system ends, the counter initialization unit 1150 ends the processing.

<3-3 Summary>

The bus arbiter 1140 relating to Embodiment 3 performs the same operations as the bus arbiter 140 relating to Embodiment 1, as long as the constraints for band are satisfied.

According to the bus arbiter 140 relating to Embodiment 1, when the constraints for band are not satisfied, the counter value falls below the lower limit threshold value, and this might cause the loss of information indicating the magnitude relation between the counter values each indicating the priority of a corresponding master. As a result, there arises a possibility that the bus arbiter 140 cannot perform arbitration in accordance with a bandwidth requested by each of the masters. That is, the QoS might deteriorate.

According to the bus arbiter 1140 relating to Embodiment 3, when an error of a counter value is detected, all the counter values in the bus arbiter 1140 is initialized. This suppress the deterioration in QoS.

4. Supplement 1

Although the embodiments of the resource request arbitration device relating to the present invention has been described above, the exemplified resource request arbitration device may be modified as shown below. The present invention is not limited to the above embodiments.

(1) According to the resource request arbitration device described in the above embodiments, a bus usage request issued by each master to the bus arbiter is a transaction command of a bus protocol used on the system bus. The bus usage request is not limited to this. Alternatively, it is only necessary to notify the bus arbiter of that the master has issued a bus usage request. Accordingly, the master may output a simple signal in order to notify of issuing of the usage request, and then issue a transaction command after acquiring a bus permission.

(2) In Embodiment 2, the level value is calculated as shown in the flowchart in FIG. 5. The method of calculating level values is not limited to this. Alternatively, the throughput interval of the slave may be represented by a power of two, and a simple shift operation may be performed to calculate a level value, for example. Further alternatively, a constant number times the throughput interval of the slave may be stored as a table beforehand, and a level value may be obtained with reference to the table.

(3) The resource request arbitration device relating to Embodiment 2 generates a one-hot request level signal. The structure in which the request level signal is propagated to the downstream by performing a bitwise OR operation is not limited to this. Alternatively, a level signal may be generated such that a level signal having a lower priority is masked. For example, when the level value is zero, the level signal has a value of 111. When the level value is one, the level signal has a value of 110. When the level value is two, the level signal has a value of 100. In this case, the magnitude relation in priority between the masters is consistent with the magnitude relation in value between the request level signals. This allows the comparison unit to specify a master to be prioritized based on the magnitude relation in value between the request level signals.

(4) In the above embodiments, when a counter value (level value) stored in a counter corresponding to an upstream master is equal to a counter value (level value) stored in a counter corresponding to a target master, a signal indicating that the upstream master should be prioritized is always output to the selection unit. Alternatively, in the above case, a signal indicating that the target master should be prioritized may be always output to the selection unit. Further alternatively, a master that should be prioritized may be changed alternately between an upstream master and a target master by the round-robin method. Yet alternatively, a master determined at random may be prioritized. There is a possibility that in the case where the constraints for bands are not satisfied and the fixed priority method is used, a specific master continuously acquires a bus permission. With the round-robin method, the method of determining a master at random, or the like, it is possible to avoid such a situation where a specific master continuously acquires a bus permission.

(5) In the above embodiments, the counter decrements the counter value while a transfer request command is stored, and the counter increments the counter value after the corresponding master acquires a bus permission. Alternatively, the operations by the counter may be performed in a converse manner. Specifically, the counter may increment the counter value while a transfer request command is stored, and the counter may decrement the counter value after the corresponding master acquires a bus permission.

(6) In the above embodiments, the number of masters connected with the resource request arbitration device is three. The number of masters connected with the resource request arbitration device does not necessarily need to be three, and alternatively may be any value. Also, the number of slaves may be any value. For example, a plurality of slaves may be available by increasing the number of resource request arbitration devices depending on the number of slaves.

(7) In the above embodiments, the upper limit threshold value of the counter value is equal to the throughput interval of the master. Alternatively, the upper limit threshold value may be equal to a product of the throughput interval of the slave and the number of masters connected with the bus arbiter, for example.

(8) In the above embodiments, the sockets are connected to each other in a daisy-chain topology. The connection topology for sockets is not limited to this. For example, the sockets may be connected to each other in a ring topology, in a star topology, or in a tree topology. The above topologies allow to propagate the priority to the downstream through each of the sockets once.

(9) The above embodiments and modifications may be combined partially with each other.

Figure 14:
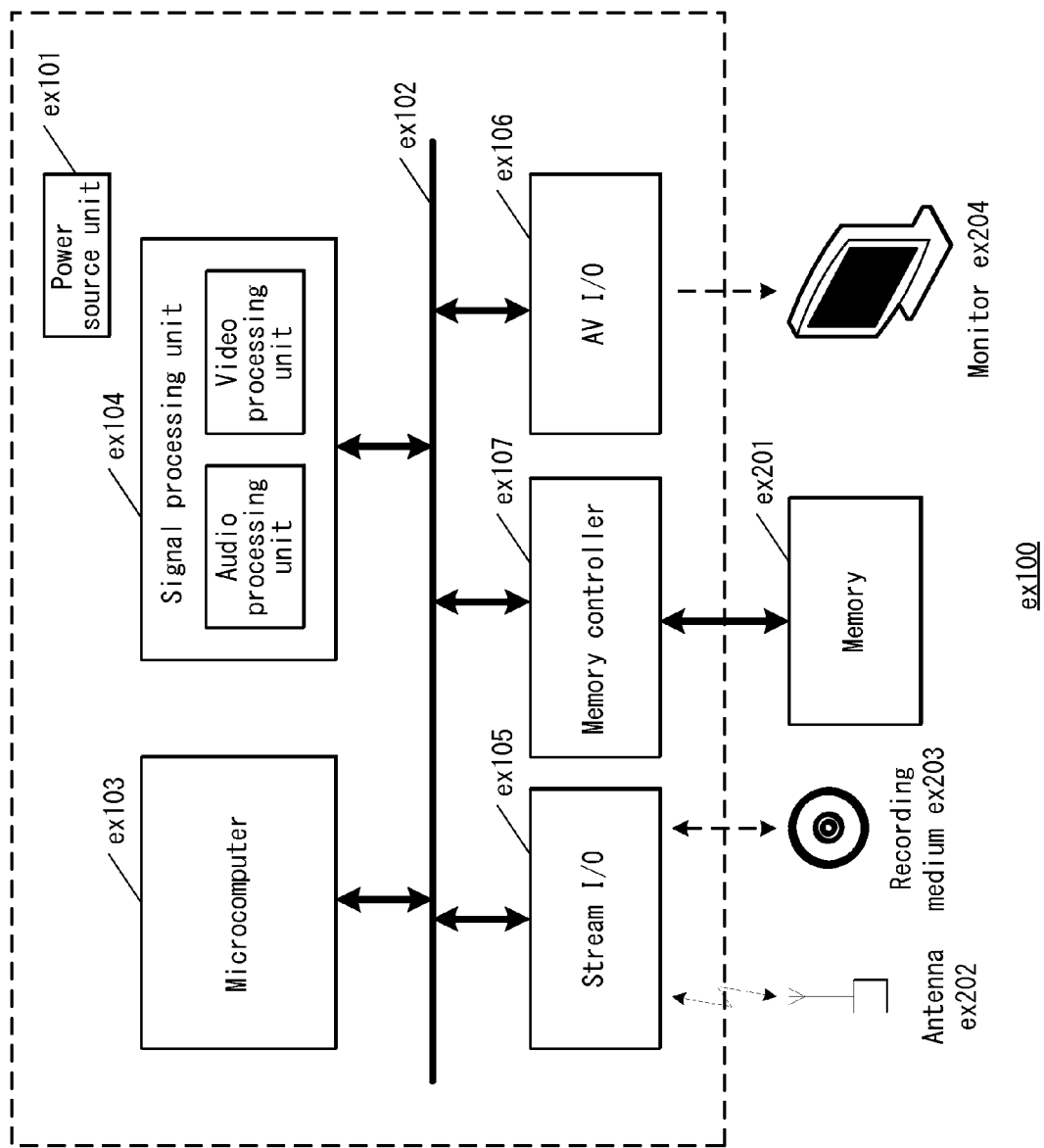
FIG. 14 is a block diagram showing an example of the entire structure of a bus system including a resource request arbitration device.

(10) The bus system described in the above embodiments is typically embodied as an LSI that is an integrated circuit. FIG. 14 shows an example of the entire structure of a bus system including the bus arbiter relating to the present invention. A bus system LSI ex100 includes a microcomputer ex103, a signal processing unit ex104, a stream I/O ex105, an AV I/O ex106, and a memory controller ex107. A system bus ex102 includes the bus arbiter described in the above embodiments, and the structural elements are connected to each other via the system bus ex102. The bus system LSI ex100 accesses a memory ex201 via the memory controller ex107. When in power-on, a power source circuit unit ex101 supplies electrical power to the structural elements to activate the structural elements to be operable. The resource request arbitration device described in the above embodiments arbitrates, via the bus ex102, buss usage requests to the memory ex201 (the memory controller ex107), which is a slave, issued by the microcomputer ex103, the signal processing unit ex104, the stream I/O ex105, and the AV I/O ex106.

The following describes operations of the bus system LSI ex100 with use of an example of processing of decoding encoded video data, audio data, or the like input by an antenna ex202, a recording medium ex203, or the like.

Under control by the microcomputer ex103, the stream I/O ex105 transfers, to the memory ex201, encoded data input by the antenna ex202, the recording medium ex203, or the like.

Under control by the microcomputer ex103, the signal processing unit ex104 acquires encoded data stored in the memory ex201, and performs decoding processing on the encoded data. After performing the decoding processing, the signal processing unit ex104 transfers the decoded audio data and video data to the memory ex201 so as to be played back in synchronization.

Under control by the microcomputer ex103, the AV I/O ex106 acquires the decoded data from the memory ex201, and outputs the decoded data to a monitor ex204 or the like.

Here, the data is divided into pieces depending on a processing amount, processing speed, or the like, and each processing is performed on the data in plural batches.

According to the bus system LSI ex100, the bus arbiter described in the above embodiments arbitrates bus usage requests for accessing the memory ex201 issued by the microcomputer ex103, the signal processing unit ex104, the stream I/O ex105, and the AV I/O ex106, so as to perform decoding processing on video data and audio data.

In this way, the resource request arbitration method described in the above embodiments is applicable to the above system. As a result, the effects described in the above embodiment can be exhibited.

Note that the memory ex201 is described as not being included in the bus system LSI ex100. Alternatively, the memory ex201 may be included in the bus system LSI ex100.

Figure 15:
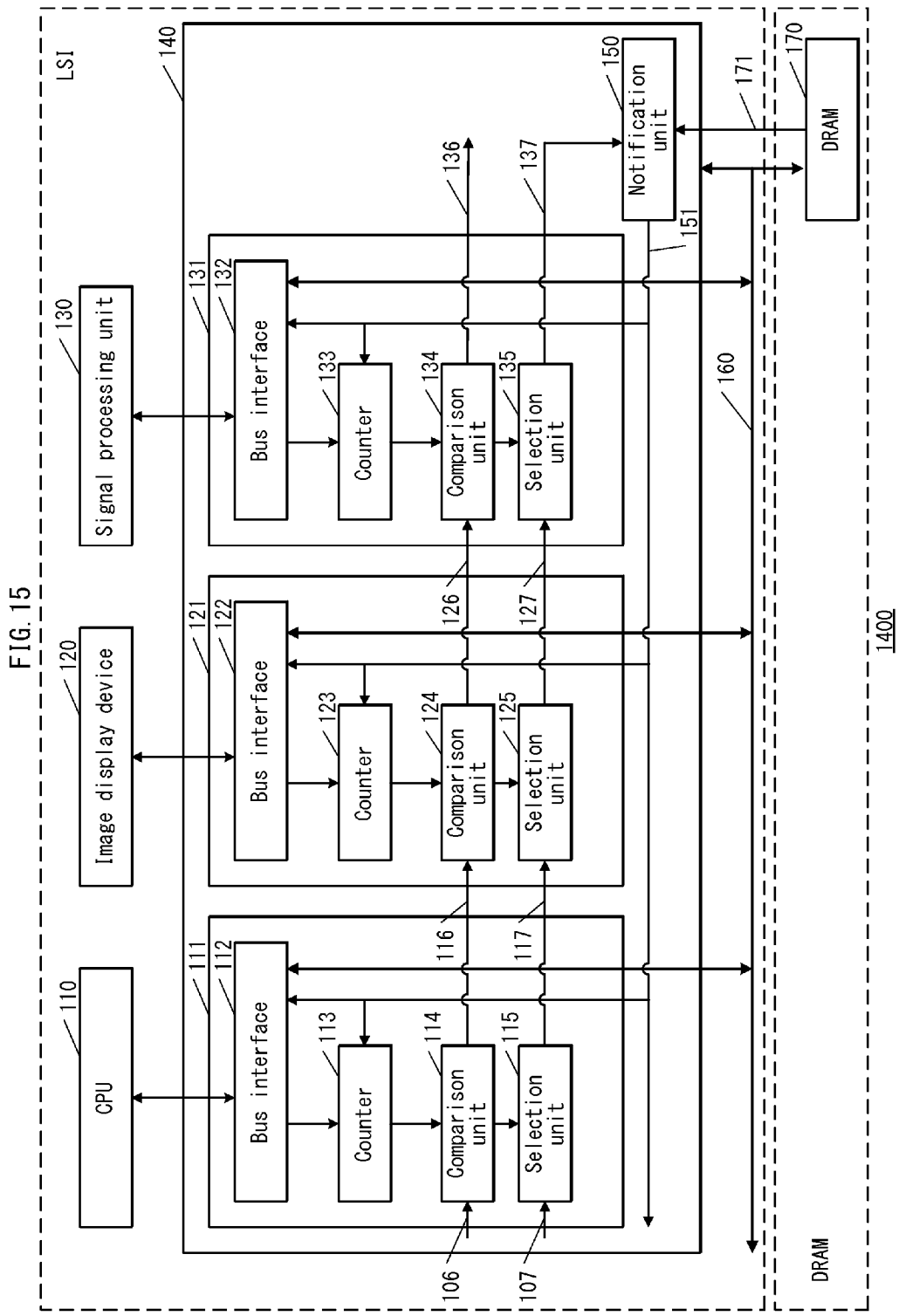
FIG. 15 is a block diagram showing an example of the structure of an integrated circuit including a resource request arbitration device.

(11) FIG. 15 is a block diagram showing the bus system relating to Embodiment 1 that is embodied as an LSI 1400. In the present modification example, the LSI 1400 includes a DRAM (Dynamic Random Access Memory) as a slave, and a CPU (Central Processing Unit), an image display device, and a signal processing device as masters.

The system LSI and the DRAM are described here. Alternatively, other storage devices may be included in the LSI 1400, such as an eDRAM (embedded DRAM), an SRAM (Static Random Access Memory), and a hard disk.

Each of the structural elements may be separately integrated into a single chip, or integrated into a single chip including part or all of the structural elements. The description is provided on the basis of an LSI here. Alternatively, the name of the integrated circuit may differ according to the degree of integration of the chips. Other integrated circuits include an IC, a system LSI, a super LSI, and an ultra LSI.

Furthermore, the method applied for forming integrated circuits is not limited to the LSI, and the present invention may be realized on a dedicated circuit or a general purpose processor. For example, the present invention may be realized on an FPGA (Field Programmable Gate Array) programmable after manufacturing LSIs, or a reconfigurable processor in which connection and settings of a circuit cell inside an LSI are reconfigurable after manufacturing LSIs.

Furthermore, when new technology for forming integrated circuits that replaces LSIs becomes available as a result of progress in semiconductor technology or semiconductor-derived technologies, functional blocks may be integrated using such technology. One possibility lies in adaptation of biotechnology.

(12) A control program may be recorded in a recording medium or distributed and made available via any type of communications channel. The control program is composed of program codes in a machine language or a high-level language, and is for causing a processor of the bus system and all the circuits connected to the processor to perform the processing described in the above embodiments such as the various type of processing. The recording medium may be an IC card, a hard disk, an optical disc, a flexible disc, a ROM, a flash memory, or the like. The control program distributed and made available is used by storage in a processor read-accessible memory or the like so that the execution of the control program by that processor also realizes each of the functions described in the above embodiment. Instead of directly executing the control program, the processor may compile the control program and executes the compiled control program, or an interpreter may execute the control program.

5. Supplement 2

The following describes the structure of the resource request arbitration device relating to the present invention and effects of modification examples.

(A) One embodiment of the present invention is a resource request arbitration device that arbitrates requests for permission to access a shared resource that are issued by a plurality of resource request devices, the resource request arbitration device comprising: a plurality of counters that are provided in one-to-one correspondence with the resource request devices, and are each configured to, while a corresponding resource request device issues the request, repeatedly decrement a counter value stored therein, and when the permission is granted to the corresponding resource request device, increment the counter value by an increment value; a specification unit configured to compare the counter values stored in the counters with each other by a tournament method to specify a resource request device corresponding to a counter that stores therein a smallest counter value among the counter values stored in the counters; and a grant unit configured to grant the permission to the specified resource request device.

With this structure, the number of comparisons is equal to the number of resource request devices connected with the resource request arbitration device. Accordingly, compared with sorting by the bubble sort mechanism or the like, it is possible to reduce both the routing congestion on the arbitration circuit and the increase in processing time that are caused by the increase in number of masters.

(B) According to the above embodiment (A), when the grant unit grants the permission to the corresponding resource request device, the counters each may increment the counter value by the increment value that is calculated based on a bandwidth requested by the corresponding resource request device.

With this structure, the resource request arbitration device can manage the QoS in accordance with the bandwidth requested by each of the resource request devices.

(C) The resource request arbitration device of the embodiment (A) may further comprise a plurality of normalization units that are provided in one-to-one correspondence with the counters, and are each configured to normalize the counter value stored in the corresponding counter to a level value whose depth is smaller than a bit width of the corresponding counter, wherein the specification unit may compare the level values normalized by the normalization units with each other instead of the counter values to specify a resource request device corresponding to a counter that stores therein a smallest level value among the level values normalized by the normalization units.

With this structure, the resource request arbitration device normalizes the counter value stored in each of the counters to a level value whose depth is smaller than a bit width of the counter, thereby to ease the routing congestion.

(D) According to the resource request arbitration device of the embodiment (C), the normalization units may each generate a level signal such that the smaller the level value is, the less significant position the level signal has an active bit at, the resource request arbitration device may further comprise a plurality of calculation units that are provided in one-to-one correspondence with the normalization units, and are each configured to perform a bitwise OR operation on a level signal generated by a corresponding normalization unit and a level signal flowing on an upstream signal line, and output a result of the bitwise OR operation to a downstream signal line, and with respect to each of the level signal generated by the normalization units, the specification unit may compare the generated level signal with the level signal flowing on the upstream signal line to specify which one of the level signals has an active bit at a less significant position, and specify the resource request device corresponding to the counter that stores therein the smallest counter value based on comparison results.

With this structure, the resource request arbitration device performs comparisons of the level signals in parallel, thereby reducing the processing time for arbitration.

(E) According to the resource request arbitration device of the embodiment (A), the specification unit may exclude, from targets of the comparison, a resource request device corresponding to a counter that stores therein a counter value exceeding an upper limit threshold value.

(F) According to the resource request arbitration device of the embodiment (A), when the counter value stored in each of the counters is equal to or smaller than a lower limit threshold value, the counter may not decrement the counter value.

With the structures in the above embodiments (E) to (F), the counter value stored in each of the counters is ensured to increment and decrement within a valid range.

(G) The resource request arbitration device according to the embodiment (A) may further comprise an initialization unit configured to, when detecting an error of the counter value stored in one of the counters, initialize the counter values stored in all the counters.

With this structure, even when the transfer bandwidth of the shared resource is narrow than the bandwidth requested by the resource request device, it is possible to suppress the deterioration in QoS.

(H) According to the resource request arbitration device of the embodiment (A), the grant unit may grant the permission to none of the resource request devices for a predetermined period after granting the permission to one of the resource request devices.

After granting the bus permission to one of the masters, the resource request arbitration device monitors the channels on the system bus, and grants the bus permission to none of the masters for a predetermined period. With this structure, in the case where a master to which the buss permission has been granted cannot start data transfer soon for some reasons, other remaining masters are prohibited from acquiring buss permission to start data transfer. Therefore, it is possible to ensure that the order of acquiring the buss permission and the order of performing data transfer are identical.

(I) According to the resource request arbitration device of the embodiment (A), when the counter values are equal to each other as a result of the comparison, the specification unit may specify one of the resource request devices in accordance with order determined by a round-robin method.

(J) According to the resource request arbitration device of the embodiment (A), when the counter values are equal to each other as a result of the comparison, the specification unit may randomly specify one of the resource request devices.

With the above structures in the embodiments (I) and (J), even in the case where the transfer bandwidth of the shared resource is narrow than the bandwidth requested by the resource request device, it is possible to avoid a specific resource request device from continuously acquiring access permission.

INDUSTRIAL APPLICABILITY

The resource request arbitration device relating to the present invention is variously applicable to high-resolution information display devices and imaging devices such as TVs, digital video recorders, car navigation systems, mobile phones, digital cameras, and digital video cameras.

REFERENCE SIGNS LIST 100 bus system
110, 120, and 130 master
111, 121, and 131 socket
112, 122, and 132 bus interface
113, 123, and 133 counter
114, 124, and 134 comparison unit
115, 125, and 135 selection unit
106, 116, 126, and 136 prioritized counter signal line
107, 117, 127, and 137 master identification signal line
140 bus arbiter
150 notification unit
151 arbitration result notification signal line
160 system bus
170 slave
171 slave availability signal line
700 bus system
710, 720, and 730 socket
711, 721, and 731 normalization unit
712, 123, and 133 calculation unit
713, 723, and 733 comparison unit
704, 714, 724, and 734 request level signal line
740 bus arbiter
1100 bus system
1110, 1120, and 1130 socket
1111, 1121, and 1131 counter
1140 bus arbiter
1150 counter initialization unit
ex100 bus system
ex101 power source unit
ex102 system bus
ex103 microcomputer
ex104 signal processing unit
ex105 stream I/O
ex106 AV I/O
ex107 memory controller
ex201 memory
ex202 antenna
ex203 recording medium
ex204 monitor

The invention claimed is:

1. A resource request arbitration device that grants permission to access a shared resource to a resource request device having a highest priority among a plurality of resource request devices that each issue a request to access the shared resource, the resource request arbitration device comprising:
- a plurality of counters that are provided in one-to-one correspondence with the resource request devices, and are each configured to store therein a counter value indicating a priority of a corresponding resource request device;
- a plurality of level signal generation units that are provided in one-to-one correspondence with the counters, and are each configured to generate a one-hot level signal based on a counter value stored in a corresponding counter; and
- a specification unit configured to specify the resource request device having the highest priority based on a bit position of an active bit of the level signal generated by each of the level signal generation units,
- wherein the specification unit compares the level signals generated by the level signal generation units to specify a level signal having an active bit at a bit position with a highest priority among the level signals, and specifies, as the resource request device having the highest priority, one of the resource request devices that corresponds to the specified level signal.

2. The resource request arbitration device of claim 1, wherein
- the level signal generation units each normalize the counter value stored in the corresponding counter to a level value whose depth is smaller than a bit width of the corresponding counter, and generate the level signal based on the level value.

3. The resource request arbitration device of claim 2, wherein
- the level signal generation units each generate the level signal such that the higher priority a corresponding resource request device has, the less significant position the level signal has an active bit at, and
- the specification unit specifies a level signal generation unit that has generated a level signal having an active bit at a least significant position among the level signals generated by the level signal generation units, and specifies a resource request device corresponding to the specified level signal generation unit as the resource request device having the highest priority.

4. The resource request arbitration device of claim 2, further comprising
- a plurality of calculation units that are provided in one-to-one correspondence with the level signal generation units, and are connected to each other in a daisy-chain topology via a plurality of signal lines, wherein
- the calculation units each perform a bitwise OR operation on a level signal generated by a corresponding level signal generation unit and a level signal flowing on an upstream signal line, and output a result of the bitwise OR operation to a downstream signal line, and
- the specification unit judges which one of the level signal generated by the corresponding level signal generation unit and the level signal flowing on the upstream signal line has an active bit at a less significant position with respect to each of the calculation units, and specifies a level signal generation unit that has generated a level signal having an active bit at a least significant position among the level signals generated by the level signal generation units based on results of the judgments.

5. The resource request arbitration device of claim 1, wherein
while the corresponding resource request device issues the request, the counters each decrement the counter value per clock cycle, and
when the permission is granted to the corresponding resource request device, the counters each increment the counter value by a value based on a bandwidth requested by the corresponding resource request device.

6. A resource request arbitration system including a shared resource, a plurality of resource request devices that each issue a request to access the shared resource, and a resource request arbitration device that grants permission to access a resource request device having a highest priority among the resource request devices, the resource request arbitration device comprising:
- a plurality of counters that are provided in one-to-one correspondence with the resource request devices, and are each configured to store therein a counter value indicating a priority of a corresponding resource request device;
- a plurality of level signal generation units that are provided in one-to-one correspondence with the counters, and are each configured to generate a one-hot level signal based on a counter value stored in a corresponding counter; and
- a specification unit configured to specify the resource request device having the highest priority based on a bit position of an active bit of the level signal generated by each of the level signal generation units,
- wherein the specification unit compares the level signals generated by the level signal generation units to specify a level signal having an active bit at a bit position with a highest priority among the level signals, and specifies, as the resource request device having the highest priority, one of the resource request devices that corresponds to the specified level signal.

7. A resource request arbitration method that is for use in a resource request arbitration device including a plurality of counters that each store therein a counter value indicating a priority of a different one of a plurality of resource request devices that each issue a request to access a shared resource, and is for granting permission to access the shared resource to a resource request device having a highest priority among the resource request devices, the resource request arbitration method comprising:
- a level signal generating step of generating a one-hot level signal based on each of the counter values stored in the counters; and
- a specifying step of specifying the resource request device having the highest priority based on a bit position of an active bit of the generated level signals,
- wherein the specifying step further comprises comparing the level signals generated in the level signal generating step to specify a level signal having an active bit at a bit position with a highest priority among the level signals, and specifying, as the resource request device having the highest priority, one of the resource request devices that corresponds to the specified level signal.

8. An integrated circuit for use in a resource request arbitration device that grants permission to access a shared resource to a resource request device having a highest priority among a plurality of resource request devices that each issue a request to access the shared resource, the integrated circuit comprising:
- a plurality of counters that are provided in one-to-one correspondence with the resource request devices, and are each configured to store therein a counter value indicating a priority of a corresponding resource request device;

a plurality of level signal generation units that are provided in one-to-one correspondence with the counters, and are each configured to generate a one-hot level signal based on a counter value stored in a corresponding counter; and a specification unit configured to specify the resource request device having the highest priority based on a bit position of an active bit of the level signal generated by each of the level signal generation units, wherein the specification unit compares the level signals generated by the level signal generation units to specify a level signal having an active bit at a bit position with a highest priority among the level signals, and specifies, as the resource request device having the highest priority, one of the resource request devices that corresponds to the specified level signal.

9. A non-transitory computer-readable recording medium having a computer program stored thereon, the computer program for causing a resource request arbitration device to perform resource request arbitration processing for granting permission to access a shared resource to a resource request device having a highest priority among a plurality of resource request devices that each issue a request to access the shared resource, the resource request arbitration device including a plurality of counters that each store therein a counter value indicating a priority of a different one of the resource request devices, and the computer program for causing the resource request arbitration device to perform the resource request arbitration processing by executing a method comprising:

a level signal generating step of generating a one-hot level signal based on each of the counter values stored in the counters; and a specifying step of specifying the resource request device having the highest priority based on a bit position of an active bit of the generated level signals, wherein the specifying step further comprises comparing the level signals generated in the level signal generating step to specify a level signal having an active bit at a bit position with a highest priority among the level signals, and specifying, as the resource request device having the highest priority, one of the resource request devices that corresponds to the specified level signal.

10. A resource request arbitration device that grants permission to access a shared resource to a resource request device having a highest priority among a plurality of resource request devices that each issue a request to access the shared resource, the resource request arbitration device comprising:

a plurality of counters that are provided in one-to-one correspondence with the resource request devices, and are each configured to store therein a counter value indicating a priority of a corresponding resource request device;

a plurality of level signal generation units that are provided in one-to-one correspondence with the counters, and are each configured to generate a one-hot level signal based on a counter value stored in a corresponding counter; and a specification unit configured to specify the resource request device having the highest priority based on a bit position of an active bit of the level signal generated by each of the level signal generation units, wherein the level signal generation units each normalize the counter value stored in the corresponding counter to a level value whose depth is smaller than a bit width of the corresponding counter, and generate the level signal based on the level value.

* * * * *